United States Patent
Lee et al.

(10) Patent No.: US 10,547,767 B2
(45) Date of Patent: Jan. 28, 2020

(54) ELECTRONIC DEVICE AND METHOD FOR PROVIDING ADSORPTION INFORMATION OF FOREIGN SUBSTANCE ADSORBED BY CAMERA

(71) Applicant: Samsung Electronics Co., Ltd., Suwon-si, Gyeonggi-do (KR)

(72) Inventors: Jaesung Lee, Seongnam-si (KR); Intaek Oh, Seongnam-si (KR); Jinhee Won, Ansan-si (KR); Jongmin Choi, Seoul (KR); Jeongmin Park, Hwaseong-si (KR); Seungeun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/013,257

(22) Filed: Jun. 20, 2018

(65) Prior Publication Data

US 2019/0014240 A1 Jan. 10, 2019

(30) Foreign Application Priority Data

Jul. 7, 2017 (KR) ........................ 10-2017-0086661

(51) Int. Cl.
*H04N 5/225* (2006.01)
*H04N 5/217* (2011.01)
(Continued)

(52) U.S. Cl.
CPC ......... *H04N 5/2171* (2013.01); *H04N 5/2256* (2013.01); *H04N 5/2257* (2013.01);
(Continued)

(58) Field of Classification Search
CPC .................................................. H04N 5/2257
(Continued)

(56) References Cited

U.S. PATENT DOCUMENTS 5,483,346 A * 1/1996 Butzer ............... G01J 4/00
250/225
2005/0035926 A1 2/2005 Takenaga et al.
(Continued)

FOREIGN PATENT DOCUMENTS

WO 2005-064321 A1 7/2005

OTHER PUBLICATIONS

International Search Report dated Sep. 12, 2018 issued in International Application No. PCT/KR2018/006155.

*Primary Examiner* — Anthony J Daniels
(74) *Attorney, Agent, or Firm* — Jefferson IP Law, LLP

(57) ABSTRACT

An electronic device and a method for providing information of a foreign substance adsorbed from the outside of a camera are provided. The electronic device includes a transparent member formed with a first medium, a light emitter disposed under the transparent member and configured to emit light, a camera disposed under the transparent member and configured to obtain an image of an external object, and a processor. The processor may be configured to obtain a first image of the external object by using a difference of light refracting angles between the first medium and the second medium formed at an outer part of the transparent member by using the camera while at least one part of the light emitted by the light emitter is transmitted through an inner part of a second medium, obtain a second image of the external object by using the camera, and provide foreign substance information of a third medium adsorbed on at least one part of an outer surface of the transparent member by using a color difference between at least one partial area of the first image and at least one partial area of the second image.

20 Claims, 25 Drawing Sheets

(51) Int. Cl.
*H04N 5/232* (2006.01)
*H04N 5/235* (2006.01)

(52) U.S. Cl.
CPC ......... *H04N 5/2351* (2013.01); *H04N 5/2354* (2013.01); *H04N 5/23222* (2013.01); *H04N 5/232933* (2018.08)

(58) Field of Classification Search
USPC .................................................. 348/207.99
See application file for complete search history.

(56) References Cited

U.S. PATENT DOCUMENTS

| | | | |
|---|---|---|---|
| 2007/0165213 A1 | 7/2007 | Fang et al. | |
| 2007/0216897 A1* | 9/2007 | Sonda | G01N 21/896 356/239.1 |
| 2008/0068587 A1 | 3/2008 | Kawasaki | |
| 2011/0080494 A1 | 4/2011 | Mori et al. | |
| 2012/0295665 A1* | 11/2012 | Pantfoerder | G01J 1/0407 455/566 |
| 2014/0191110 A1 | 7/2014 | Holenarsipur | |
| 2014/0270532 A1 | 9/2014 | Sawaki et al. | |

* cited by examiner

FIG. 17
| | LIGHT EMITTER – OFF | LIGHT EMITTER – ON | DIFFERENCE VALUE OF COLOR INFORMATION |
|---|---|---|---|
| FOREIGN SUBSTANCE – YES | 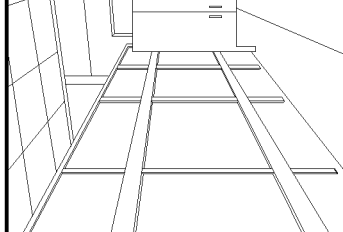 54631255 | 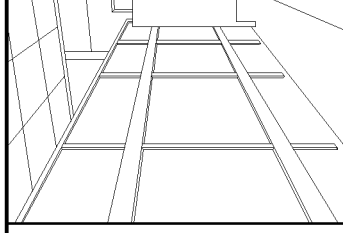 54869482 | 238227 [0.44 %] |
| FOREIGN SUBSTANCE – NO | 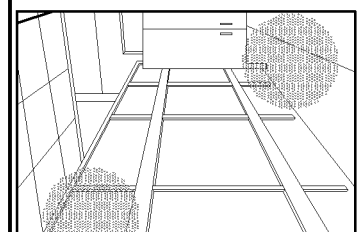 57425864 | 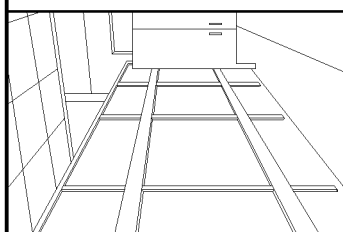 60080373 | 2654509 [4.41 %] |

ELECTRONIC DEVICE AND METHOD FOR PROVIDING ADSORPTION INFORMATION OF FOREIGN SUBSTANCE ADSORBED BY CAMERA

CROSS-REFERENCE TO RELATED APPLICATION(S)

This application is based on and claims priority under 35 U.S.C. § 119(a) of a Korean patent application number 10-2017-0086661, filed on Jul. 7, 2017, in the Korean Intellectual Property Office, the disclosure of which is incorporated by reference herein in its entirety.

BACKGROUND

1. Field

The disclosure relates to a device and a method for detecting a foreign substance adsorbed by a transparent member on a camera of an electronic device and informing a user about adsorption information of the detected foreign substance.

2. Description of Related Art

As use of a portable electronic device, such as a smartphone and tablet/wearable equipment, is increasing, various functions are being applied to the electronic device.

For example, the electronic device can determine a user's health state by using a biometric sensor, such as a heart rate monitoring (HRM) sensor or a photo-plethysmography (PPG) sensor.

Further, the electronic device can provide services, such as image photographing, video recording, and a video call by using a camera.

The above information is presented as background information only to assist with an understanding of the disclosure. No determination has been made, and no assertion is made, as to whether any of the above might be applicable as prior art with regard to the disclosure.

SUMMARY

An electronic device can protect a camera and a biometric sensor from external impacts by installing a transparent cover on the camera and the biometric sensor.

In the case that a user of the electronic device determines a heartrate by using the biometric sensor, the transparent cover disposed adjacent to the biometric sensor can be touched regardless of the user's intention.

In this case, foreign substances, such as oil and moisture stained on a user's fingerprint can be adsorbed by the transparent cover of the camera.

Accordingly, a blur can be included in a photo or a video captured by using the camera of the electronic device, and a distortion can be generated in the captured photo or video.

Aspects of the disclosure are to address at least the above-mentioned problems and/or disadvantages and to provide at least the advantages described below. Accordingly, an aspect of the disclosure is to provide an electronic device and a method for detecting a foreign substance adsorbed by a transparent member of a camera and for notifying adsorption information of the detected foreign substance to a user of the electronic device.

Another aspect of the disclosure is to provide a computer readable recording medium recorded with a program executing a method for providing adsorption information of a foreign substance in the electronic device.

Additional aspects will be set forth in part in the description which follows and, in part, will be apparent from the description, or may be learned by practice of the presented embodiments.

In accordance with another aspect of the disclosure, an electronic device is provided. The electronic device includes a transparent member formed with a first medium, a light emitter disposed under the transparent member and configured to emit light, a camera disposed under the transparent member and configured to obtain an image of an external object, and a processor. The processor may be configured to obtain a first image of the external object by using a difference of light refracting angles between the first medium and the second medium formed at an outer part of the transparent member by using the camera while at least one part of the light emitted by the light emitter is transmitted through an inner part of a second medium, obtain a second image of the external object by using the camera, and provide foreign substance information of a third medium adsorbed on at least one part of an outer surface of the transparent member by using a color difference between at least one partial area of the first image and at least one partial area of the second image.

In accordance with another aspect of the disclosure, a method for providing adsorption information of a foreign substance in an electronic device is provided. The method includes emitting light towards a camera disposed under a transparent member formed with a first medium by using a light emitter, obtaining, by a processor, a first image of an external object by using a difference of light refracting angles between the first medium and the second medium formed at an outer part of the transparent member by using the camera while at least one part of the light emitted by the light emitter is transmitted through an inner part of a second medium, obtaining, by the processor, a second image of the external object by using the camera, and providing, by the processor, foreign substance information of a third medium adsorbed on at least one part of an outer surface of the transparent member by using a color difference between at least one partial area of the first image and at least one partial area of the second image.

In accordance with another aspect of the disclosure, a computer readable recording medium recorded with a program executing a method for providing foreign substance adsorption information in an electronic device is provided. The computer-readable recording medium includes a transparent member formed with a first medium, a light emitter disposed under the transparent member for emitting light, a camera disposed under the transparent member for obtaining an image of an external object, and a processor. The method may comprise the operations of obtaining a first image of the external object by using a difference of light refracting angles between the first medium and the second medium formed at an outer part of the transparent member by using the camera while at least one part of the light emitted by the light emitter is transmitted through an inner part of a second medium, obtaining a second image of the external object by using the camera, and providing foreign substance information of a third medium adsorbed on at least one part of an outer surface of the transparent member by using a color difference between at least one partial area of the first image and at least one partial area of the second image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 17 illustrates difference values of color information of images according to a foreign substance adsorbed by a transparent member and an on/off state of a light emitter in an electronic device according to various embodiments of the disclosure;

Throughout the drawings, it should be noted that like reference numbers are used to depict the same or similar elements, features, and structures.

DETAILED DESCRIPTION

Figure 1:
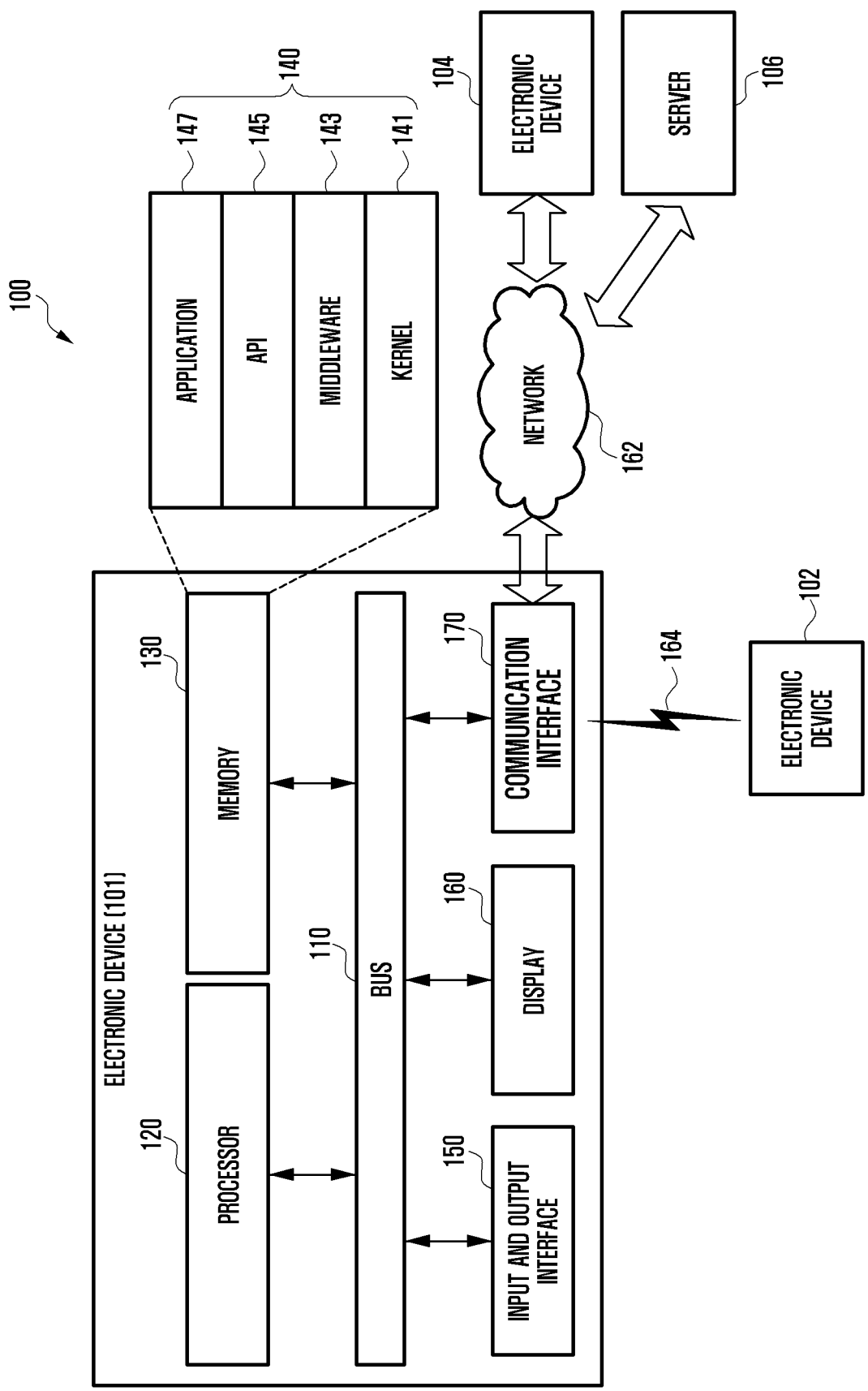
FIG. 1 is a block diagram illustrating a network environment including an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have," "may have," "include," and "may include" as used herein indicate the presence of corresponding features (for example, elements, such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms, such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

Electronic devices according to embodiments of the disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) Audio Layer 3 (MP3) players, mobile medical devices, cameras, wearable devices, or the like. According to an embodiment of the disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), implantable wearable devices (e.g., implantable circuits), or the like.

The electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, electronic picture frames, or the like.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, wave meters, or the like). The electronic devices may be one or more combinations of the above-mentioned devices. The electronic devices may be flexible electronic devices. In addition, the electronic devices are not limited to the above-mentioned devices, and may include new electronic devices according to the development of new technologies.

Hereinafter, electronic devices according to various embodiments of the disclosure will be described with reference to the accompanying drawings. The term "user" as used herein may refer to a person who uses an electronic device or may refer to a device (e.g., an artificial intelligence electronic device) which uses an electronic device.

FIG. 1 illustrates a network environment including an electronic device according to an embodiment of the disclosure.

Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101.

The bus 110 may be a circuit connecting the above described components 120, 130, and 150-170 and transmitting communications (e.g., control messages and/or data) between the above described components.

The processor 120 may include one or more of a CPU, an AP, and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, an application programming interface (API) 145, application programs (or applications) 147, or the like. The kernel 141, the middleware 143 or at least part of the API 145 may be called an operating system (OS).

The kernel 141 is capable of controlling or managing system resources (e.g., the bus 110, the processor 120, the memory 130, or the like) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, or the like) to at least one of the application programs 147. For example, the middleware 143 processes one or more task requests according to a priority assigned to at least one application program, thereby performing scheduling or load balancing for the task requests.

The API 145 may be an interface that is configured to allow the application programs 147 to control functions provided by the kernel 141 or the middleware 143. The API 145 may include at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-Electro-mechanical systems (MEMS) display, an electronic paper display, or the like. The display 160 is capable of displaying various types of content (e.g., texts, images, videos, icons, symbols, or the like). The display 160 may also be implemented with a touch screen. In this case, the display 160 is capable of receiving touches, gestures, proximity inputs or hovering inputs, via a stylus pen, a user's body, or the like.

The communication interface 170 is capable of establishing communication between the electronic device 101 and an external device. For example, the communication interface 170 is capable of communicating with an external device connected to a network 162 via wired or wireless communication.

Wireless communication may employ, as cellular communication protocol, at least one of long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 164. Short-wireless communication 164 may include at least one of wireless fidelity (Wi-Fi), Bluetooth (BT), near field communication (NFC), magnetic secure transmission (MST), and global navigation satellite system (GNSS). The GNSS may include at least one of GPS, GNSS (Glonass), Beidou NSS (Beidou), Galileo, the European global satellite-based navigation system, according to GNSS using areas, bandwidths, or the like. In the disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of the following: a telecommunications network, e.g., a computer network (e.g., local area network (LAN) or wide area network (WAN)), the Internet, and a telephone network.

A first external electronic device 102 and a second external electronic device 104 are each identical to or different from the electronic device 101, in terms of type. According to an embodiment of the disclosure, a server 106 is capable of including a group of one or more servers. According to various embodiments of the disclosure, part or all of the operations executed on the electronic device 101 may be executed on another electronic device or a plurality of other electronic devices (e.g., the first external electronic device 102 and the second external electronic device 104 or the server 106). According to an embodiment of the disclosure, when the electronic device needs to perform a function or service automatically or according to a request, it does not perform the function or service, but is capable of additionally requesting at least part of the function related to the function or service from another electronic device (e.g., the first external electronic device 102 and the second external electronic device 104 or the server 106). The other electronic device (e.g., the first external electronic device 102 and the second external electronic device 104 or the server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
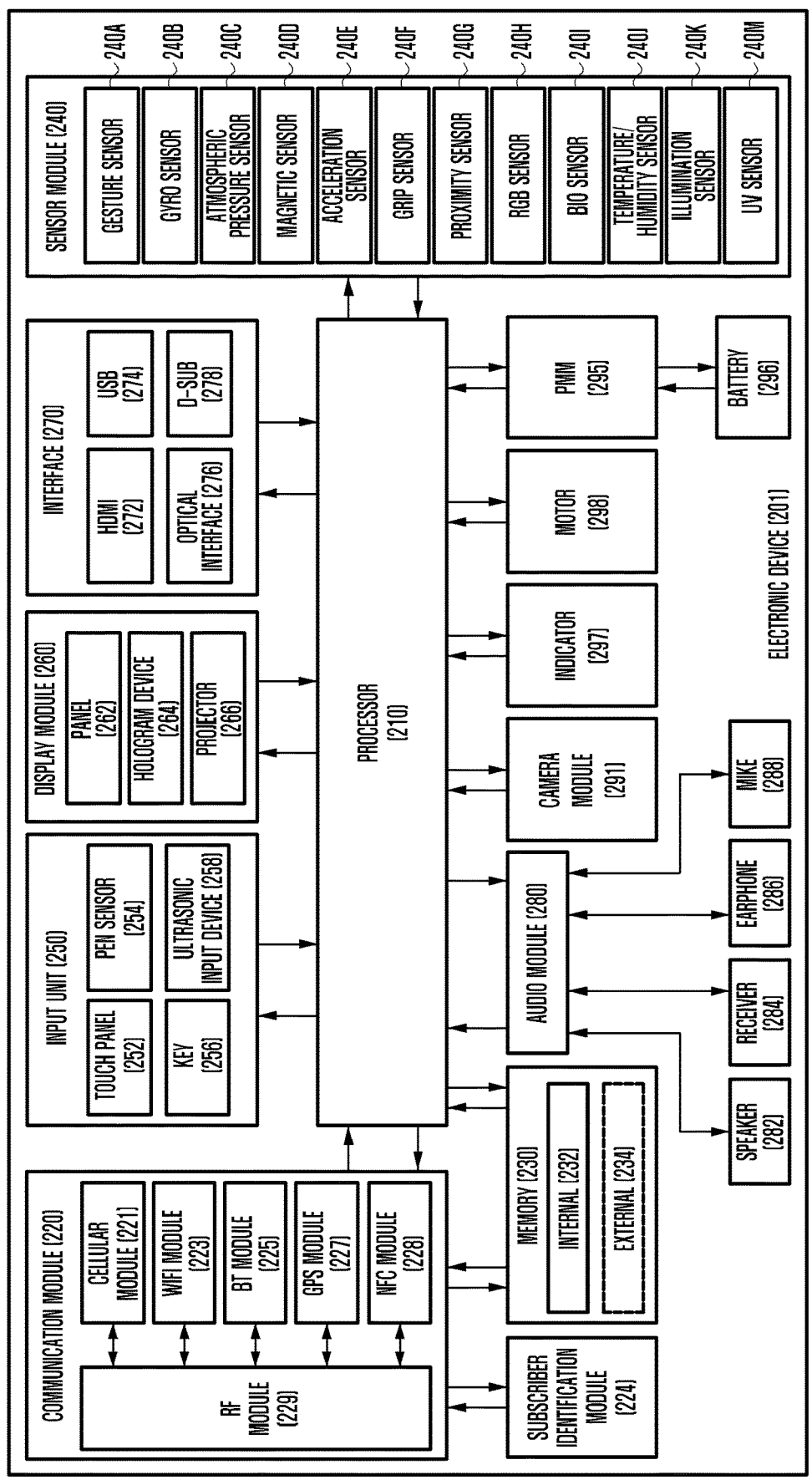
FIG. 2 is a block diagram illustrating an electronic device according to various embodiments of the disclosure.

FIG. 2 is a block diagram illustrating a configuration of an electronic device according to an embodiment of the disclosure.

Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor (ISP). The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 220 is capable of including the cellular module 221, a Wi-Fi module 223, a BT module 225, a GNSS module 227 (e.g., a GPS module, Glonass module, Beidou module or Galileo module), an NFC module 228, and a radio frequency (RF) module 229.

The cellular module 221 is capable of providing a voice call, a video call, an SMS service, an Internet service, or the like, through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP.

Each of the Wi-Fi module 223, the BT module 225, the GNSS module 227, and the NFC module 228 may include a processor for processing data transmitted or received through the corresponding module. At least part of the cellular module 221, Wi-Fi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amplifier module (PAM), a frequency filter, a low noise amplifier (LNA), an antenna, or the like. At least one of the cellular module 221, the Wi-Fi module 223, the BT module 225, the GNSS module 227, and the NFC module 228 is capable of transmission/reception of RF signals through a separate RF module.

The memory 230 may include a built-in memory 232 or an external memory 234. The built-in memory 232 is capable of including at least one of a volatile memory, e.g., a dynamic random access memory (DRAM), a static RAM (SRAM), a synchronous dynamic RAM (SDRAM), or the like. and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, a solid state drive (SSD), or the like.

The external memory 234 may include a flash drive, e.g., a compact flash (CF), a secure digital (SD), a micro secure digital (Micro-SD), a mini secure digital (Mini-SD), an extreme digital (xD), a multi-media card (MMC), a memory stick, or the like. The external memory 234 may be connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input unit 258. The touch panel 252 may be implemented with at least one of a capacitive touch system, a resistive touch system, an IR touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, a keypad, or the like. The ultrasonic input unit 258 is capable of detecting ultrasonic waves, created in an input tool, through a microphone 288, and identifying data corresponding to the detected ultrasonic waves.

The display 260 may include a panel 262, a hologram unit 264, or a projector 266. The panel 262 may include the same or similar components as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. The display 260 may further include a control circuit for controlling the panel 262, the hologram unit 264, or the projector 266.

The interface 270 may include an HDMI 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, a SD card/MMC interface, or an IR data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, or the like.

The camera module 291 is a device capable of taking both still and moving images. The camera module 291 may include one or more image sensors (e.g., a front image sensor or a rear image sensor), a lens, an (ISP, a flash (e.g., an LED or xenon lamp), or the like.

The power management module 295 is capable of managing power of the electronic device 201. The power management module 295 may include a power management integrated circuit (PMIC), a charger IC, a battery gauge, or the like. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, or the like. The battery gauge is capable of measuring the residual capacity, charge in voltage, current, temperature of the battery 296, or the like.

The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, or the like. The motor 298 is capable of converting an electrical signal into mechanical vibrations, such as, a vibration effect, a haptic effect, or the like. The electronic device 201 may also include a processing unit (e.g., GPU) for supporting a mobile TV. The processing unit for supporting a mobile TV is capable of processing media data pursuant to standards, e.g., digital multimedia broadcasting (DMB), digital video broadcasting (DVB), mediaFlo™, or the like.

Figure 3:
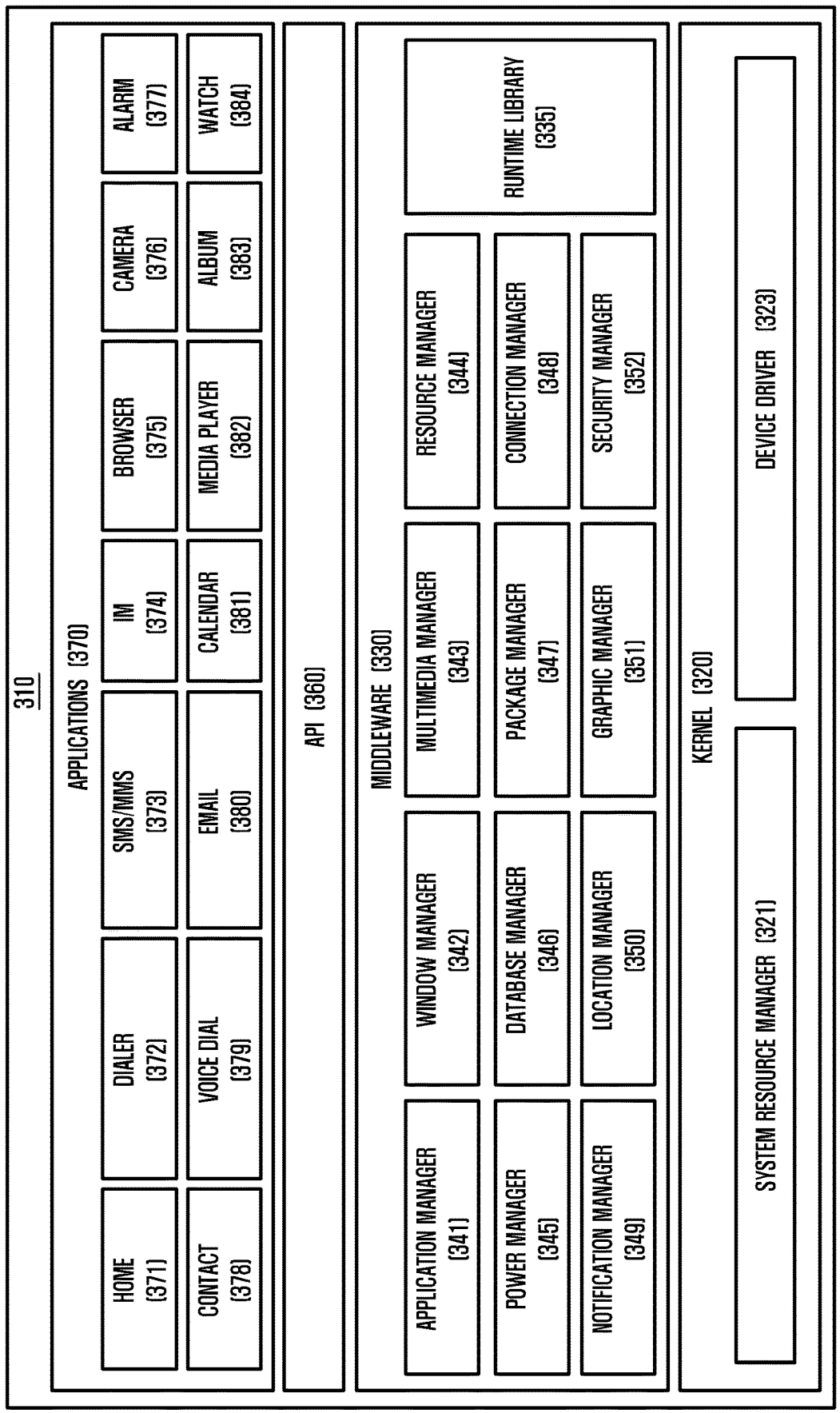
FIG. 3 is a block diagram illustrating a program module according to various embodiments of the disclosure.

FIG. 3 is a block diagram illustrating a programming module according to an embodiment of the disclosure.

Referring to FIG. 3, a program module 310 (e.g., program module 140 shown in FIG. 1) is capable of including an OS for controlling resources related to the electronic device (e.g., electronic device 101) and/or various applications (e.g., application programs 147 shown in FIG. 1) running on the OS. The OS may be Android, iOS, Windows, Symbian, Tizen, Bada, or the like.

The program module 310 is capable of including a kernel 320, middleware 330, an API 360 and/or applications 370. At least part of the program module 310 may be preloaded on the electronic device or downloaded from a server (e.g., the first external electronic device 102 or the second external electronic device 104, the server 106, or the like).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a BT driver, a shared memory driver, a USB driver, a keypad driver, a Wi-Fi driver, and an audio driver. Further, according to an embodiment of the disclosure, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment of the disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. Furthermore, although not shown, the middleware 330 may also include a payment manager.

The runtime library 335 may include, for example, a library module used by a compiler to add a new function through a programming language while the applications 370 are executed. According to an embodiment of the disclosure, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources, such as a source code, a memory, a storage space of at least one of the applications 370, or the like.

The power manager 345 may operate together with a basic input/output system (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection, such as Wi-Fi or BT. The notification manager 349 may display or notify a user of an event, such as an arrival message, an appointment, a proximity alarm, or the like, in a manner that does not disturb the user. The location manager 350 may manage location information of the electronic device. The graphic manager 351 may manage a graphic effect provided to the user or a user interface (UI) related to the graphic effect. The security manager 352 provides a general security function required for a system security or a user authentication. According to an embodiment of the disclosure, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an OS. For example, in Android or iOS, a single API set may be provided for each platform. In Tizen, two or more API sets may be provided.

The applications 370 (e.g., application programs 147) may include one or more applications for performing various functions, e.g., home 371, dialer 372, short message service (SMS)/multi-media message service (MMS) 373, instant message (IM) 374, browser 375, camera 376, alarm 377, contact 378, voice dial 379, email 380, calendar 381, media player 382, album 383, and clock 384. Furthermore, although not shown, the applications 370 may also include health care (e.g., an application for measuring amount of exercise, blood sugar level, or the like), and environment information (e.g., an application for providing atmospheric pressure, humidity, temperature, or the like).

According to an embodiment of the disclosure, the applications 370 are capable of including an application for supporting information exchange between an electronic device (e.g., electronic device 101) and an external device (e.g., the first external electronic device 102 and the second external electronic device 104), which is hereafter called 'information exchange application'). The information exchange application is capable of including a notification relay application for relaying specific information to external devices or a device management application for managing external devices.

According to various embodiments of the disclosure, the applications 370 are capable of including an application (e.g., a health care application of a mobile medical device, or the like) having specified attributes of an external device (e.g., the first external electronic device 102 and the second external electronic device 104). According to various embodiments of the disclosure, the applications 370 are capable of including applications received from an external device (e.g., the server 106, the first external electronic device 102 and the second external electronic device 104). According to various embodiments of the disclosure, the applications 370 are capable of including a preloaded application or third party applications that can be downloaded from a server. It should be understood that the components of the program module 310 may be called different names according to types of OS.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of application-specific integrated circuit (ASIC) chip, field-programmable gate arrays (FPGAs), and Programmable-Logic Device known or to be developed for certain operations.

According to various embodiments of the disclosure, the devices (e.g., modules or their functions) or methods may be implemented by computer program instructions stored in a computer-readable storage medium. In the case that the instructions are executed by at least one processor (e.g., the processor 120), the at least one processor may execute the functions corresponding to the instructions. The computer-readable storage medium may be the memory 130. At least a part of the programming module may be implemented (e.g., executed) by the processor 120. At least a part of the programming module may include modules, programs, routines, sets of instructions, and processes for executing the at least one function.

The computer-readable storage medium includes magnetic media, such as a floppy disk and a magnetic tape, optical media including a compact disc (CD) ROM and a DVD ROM, a magneto-optical media, such as a floptical disk, and the hardware device designed for storing and executing program commands, such as ROM, RAM, and flash memory. The program commands include the language code executable by computers using the interpreter as well as the machine language codes created by a compiler. The aforementioned hardware device can be implemented with one or more software modules for executing the operations of the various embodiments of the disclosure.

Certain aspects of the disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the disclosure can be easily construed by programmers skilled in the art to which the disclosure pertains.

At this point it should be noted that the various embodiments of the disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the disclosure as described above. Alternatively, one or more processors operating in accordance with stored instructions may implement the functions associated with the various embodiments of the disclosure as described above. If such is the case, it is within the scope of the disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the disclosure can be easily construed by programmers skilled in the art to which the disclosure pertains.

The module or programming module of the disclosure may include at least one of the aforementioned components with omission of some components or addition of other components. The operations of the modules, programming modules, or other components may be executed in series, in parallel, recursively, heuristically, or the like. In addition, some operations may be executed in different order, omitted, or extended with other operations.

Figure 4:
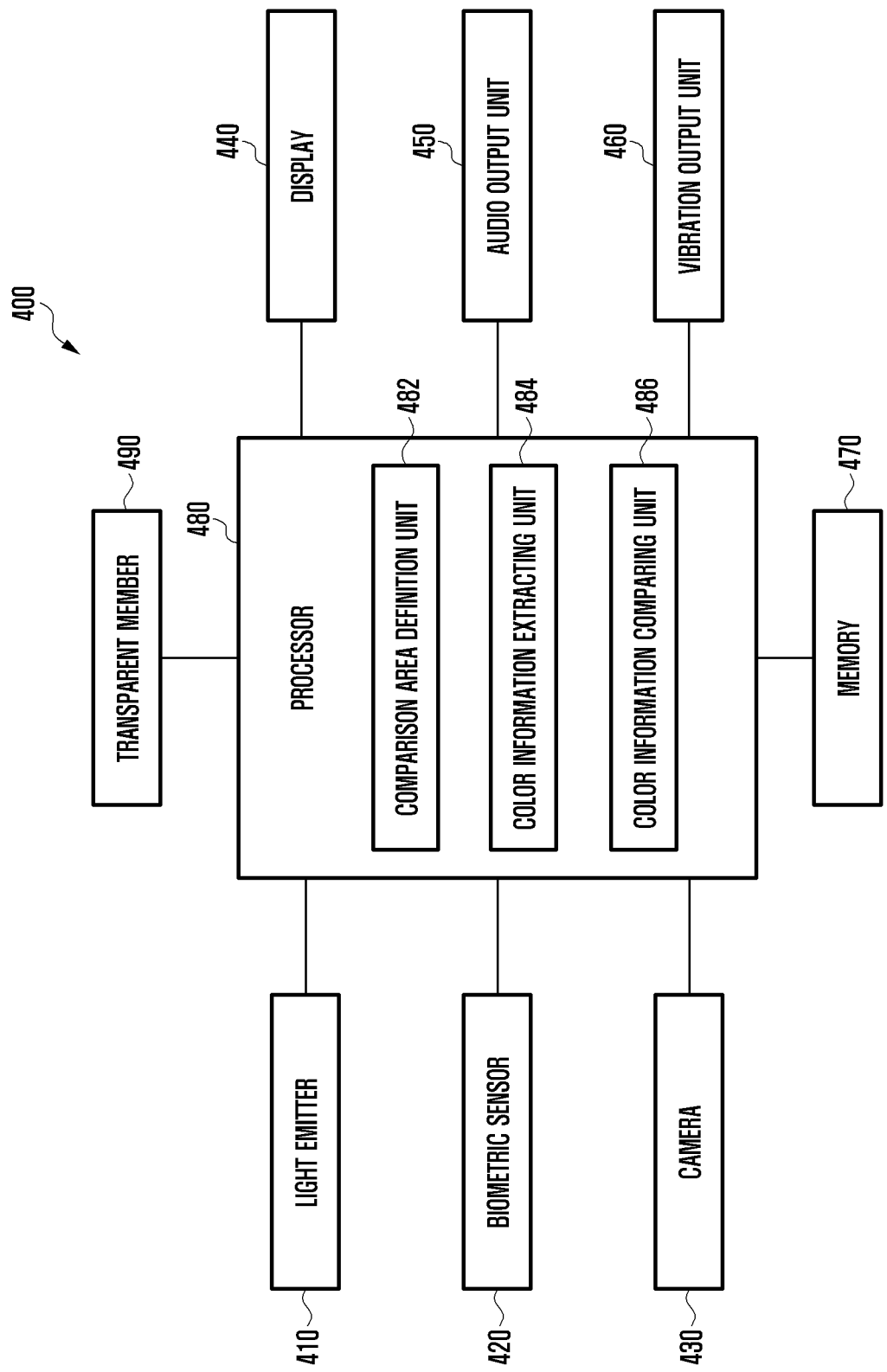
FIG. 4 is a block diagram illustrating a configuration of an electronic device according to various embodiments of the disclosure.

FIG. 4 is a block diagram illustrating a configuration of an electronic device according to various embodiments of the disclosure.

Referring to FIG. 4, an electronic device 400 according to various embodiments of the disclosure may include a light emitter 410, biometric sensor 420, a camera 430, a display 440, an audio output unit 450, a vibration output unit 460, a memory 470, a processor 480, and a transparent member 490.

According to various embodiments of the disclosure, the electronic device 400 may include, for example, at least one part of the electronic device 101, the first external electronic device 102, and the second external electronic device 104 of FIG. 1 or the electronic device 201 of FIG. 2. The electronic device 400 may include at least one of a smartphone, tablet, wearable device, and home hub device. The electronic device 400 may be an electronic device having a camera 430.

The biometric sensor 420 may include part (e.g., biometric sensor 240I) or all of the sensor module 240 of FIG. 2. The camera 430 may include the camera module 291 of FIG. 2. The display 440 may include the display 160 of FIG. 1 or the display 260 of FIG. 2. The audio output unit 450 may include the audio module 280 of FIG. 2. The memory 470 may include the memory 130 of FIG. 1 or the memory 230 of FIG. 2. The processor 480 may include the processor 120 of FIG. 1 or the processor 210 of FIG. 2.

According to various embodiments of the disclosure, at least one light emitter 410 may be disposed under the transparent member 490 to emit light. For example, the light emitter 410 may include at least one of an IR LED, red LED, green LED, and blue LED having different wave length characteristics. The light emitter 410 may be selectively used according to a user's purpose or an environment of the electronic device 400. For example, the light emitter 410 may be installed independently on a PCB of the electronic device 400 or in the biometric sensor 420.

According to various embodiments of the disclosure, the biometric sensor 420 may be disposed under the transparent member 490, and can obtain biometric information of a user of the electronic device 400. For example, the biometric sensor 420 may include a heart rate monitoring (HRM) sensor or a photo-plethysmography (PPG) sensor. The biometric sensor 420 may include a light emitter 410 and a light receiver (e.g., a light receiver 415 of FIG. 6). For example, the biometric sensor 420 can output light onto a human skin (e.g., tissue) through the light emitter 410, and detect light reflected by the human skin (e.g., tissue) through the light receiver (e.g., the light receiver 415 of FIG. 6) as an electric current signal. By processing the detected electric current signal, the electronic device 400 can measure at least one of a user's heart rate, oxygen saturation, and stress. The light receiver (e.g., the light receiver 415 of FIG. 6) may include a photo diode (PD). The light receiver can obtain a part of the light output by the light emitter 410 and reflected by the user's skin (e.g., tissue). The biometric sensor 420 can obtain a signal corresponding to the user's skin (e.g., tissue) based on a partial light obtained through the light receiver.

According to various embodiments of the disclosure, the camera 430 may be disposed under the transparent member 490, and can obtain an image (e.g., photo or video) of an external object for the electronic device 400. For example, the camera 430 may include an RGB camera. The camera 430 can operate by using a light receiver configured to receive light emitted by the light emitter 410. The camera 430 may include at least one image sensor (e.g., front sensor or rear sensor), lens, an ISP, a flashlight (e.g., an LED or a xenon lamp, or the like).

According to various embodiments of the disclosure, if a foreign substance is adsorbed by the transparent member 490 disposed on the camera 430, the display 440 can display a UI (e.g., warning message) informing a user of the electronic device 400 of the adsorption of the foreign substance.

According to various embodiments of the disclosure, the display 440 can perform an input function and a display function. For this, the display 440 may include a touch panel (e.g., touch panel 252 of FIG. 2). The display 440 may be formed with an LCD, an organic light emitting diodes (OLED), an active matrix organic light emitting diodes (AMOLED), a flexible display, a transparent display, or the like. The display 440 can provide a user visually with a menu, input data, function setting information, and other information of the electronic device 400.

According to various embodiments of the disclosure, if a foreign substance is adsorbed by the transparent member 490 disposed on the camera 430, an audio can be output for informing the user of the electronic device 400 about the adsorption of the foreign substance. The audio output unit 450 may include a speaker (e.g., speaker 282 of FIG. 2) for outputting a guide voice or other audio signals corresponding to foreign substance adsorption information stored in the memory 470.

According to various embodiments of the disclosure, if a foreign substance is adsorbed by the transparent member 490 disposed on the camera 430, the vibration output unit 460 can provide a vibration signal informing a user of the electronic device 400 of the adsorption of the foreign substance. The vibration output unit 460 may include a haptic device for informing the user of the electronic device 400 about the foreign substance adsorption information with a tactile signal.

According to various embodiments of the disclosure, the memory 470 can store a reference value for a foreign substance adsorbed by the transparent member 490 disposed on the camera 430, UI (e.g., warning message) for informing the user of the electronic device 400 about the adsorption of the foreign substance by the transparent member 490, guide voice, and intensity of vibration. The memory 470 can store a refractive index for a specific medium (e.g., transparent member, water, oil, glass, flint glass, silver, and diamond). The memory 470 can store various applications, such as a camera photographing application and a health application.

According to various embodiments of the disclosure, the memory 470 can perform a function of storing a control program for the processor 480, OS, and input/output data, and a program for controlling the general operations of the electronic device 400 can be stored in the memory 470. The memory 470 can store various kinds of setting information required for processing functions of the electronic device 400 related to various embodiments of the disclosure.

According to various embodiments of the disclosure, the processor 480 can control functions and operations of the light emitter 410, biometric sensor 420, camera 430, display 440, audio output unit 450, vibration output unit 460, and memory 470 installed in the electronic device 400. For example, the processor 480 can detect a foreign substance adsorbed by the transparent member 490 on the camera 430 by using the light emitter 410, biometric sensor 420, and camera 430 installed in the electronic device 400, and it can inform a user of the electronic device 400 about the detected foreign substance adsorption information by using at least one of the display 440, audio output unit 450, and vibration output unit 460.

According to various embodiments of the disclosure, the processor 480 may include a comparison area definition unit 482, color information extracting unit 484, and color information comparing unit 486.

The comparison area definition unit 482 can define a common area of at least 2 images when extracting color information of the at least 2 images captured by the camera 430. The comparison area definition unit 482 can define a commonly captured area in order to compare color information of the at least 2 images.

For example, the comparison area definition unit 482 can extract a common area of at least 2 images captured by the camera 430 through acceleration information. The comparison area definition unit 482 may have an algorithm of identifying a movement size based on acceleration sensor information of a first captured image and acceleration sensor information of a second captured image, and extracting the common area corresponding to the movement size. According to an embodiment of the disclosure, the common area may have a predetermined area value stored in the memory 470. According to another embodiment of the disclosure, the comparison area definition unit 482 can identify a common area of at least 2 images captured by the camera 430 through a recognizer in the camera 430. For example, if an image captured by the camera 430 is a landscape, the comparison area definition unit 482 can recognize the sky and the earth. If the image captured by the camera 430 is a portrait, the comparison area definition unit 482 can identify at least one of a face of an identical person, clothes of the identical person, and another body part of the identical person through a face recognition function. If the image captured by the camera 430 is a letter or a barcode, the comparison area definition unit 482 can identify an area of extracting the letter or the barcode. If the image captured by the camera 430 is an object, the comparison area definition unit 482 can identify an object, such as a bag, a desk, a desk lamp, or the like.

The color information extracting unit 484 can extract light information from an area defined by the comparison area definition unit 482 as a common area. For example, if at least 2 images are captured by the camera 430, the color information extracting unit 484 can extract the light information for the common area. Further, if at least one image is captured by the camera 430, the color information extracting unit 484 can extract color information of light emitted by the light emitter 410 from the at least one image. Further, the color information extracting unit 484 can extract light information from a user's face area or a predetermined area.

The color information comparing unit 486 can compare a color of a first image captured by switching on the light emitter 410 and a color of a second image captured by switching off the light emitter 410. For example, the color information comparing unit 486 can extract color information of the light emitter 410 from the first image and the second image, determine that a foreign substance is adsorbed by the transparent member 490 of the camera 430 if a color difference between the first image and the second image exceeds a predetermined reference value (e.g., about 0.01~30%), and inform a user about foreign substance adsorption information through the display 440, audio output unit 450, or vibration output unit 460. The reference value predetermined in the color information comparing unit 486 may include a numerical value and a range, and a corresponding flag value can be provided if the color difference exceeds the predetermined reference value.

According to various embodiments of the disclosure, the processor 480 may be configured to obtain a first image of the external object by using a difference of light refracting angles between the transparent member 490 formed with a first medium and the second medium formed at an outer part of the transparent member 490 by using the camera 430 while at least one part of the light emitted by the light emitter 410 is transmitted through an inner part of a second medium, obtain a second image of the external object by using the camera 430, and provide foreign substance information of a third medium adsorbed on at least one part of an outer surface of the transparent member by using a color difference between at least one partial area of the first image and at least one partial area of the second image corresponding to the at least one part of the first image.

According to various embodiments of the disclosure, if an image is captured in a state of foreign substance adsorbed by the transparent member 490, the processor 480 may be configured to store the captured image in the memory 470 by attaching a tag for informing about the adsorption of the foreign substance.

According to various embodiments of the disclosure, the processor 480 can control general operations of the electronic device 400 and signal flows between internal components and perform a function of processing data. For example, the processor 480 may be configured with a CPU, AP, and CP. The processor 480 may include a processor (e.g., sensor hub) operating with a lower power than the AP. The processor 480 may include both of the AP and a sensor hub. The processor 480 may be formed with a single core processor or multi-core processor, or configured with a plurality of processors.

According to various embodiments of the disclosure, the transparent member 490 can be disposed at an upper part of at least one of the light emitter 410, biometric sensor 420, camera 430, and display 440. The transparent member 490 may be formed with a first medium. The transparent member 490 may include at least one of a lens, window glass, and cover glass.

According to various embodiments of the disclosure, if a crack exists on the transparent member 490 and an abnormal image quality is obtained continuously from a specific area of a captured image (photo and video) from an external object, the processor 480 can determine that a crack is formed at a specific area of the transparent member 490 and provide a UI for informing about the crack through the display 440.

Figure 5:
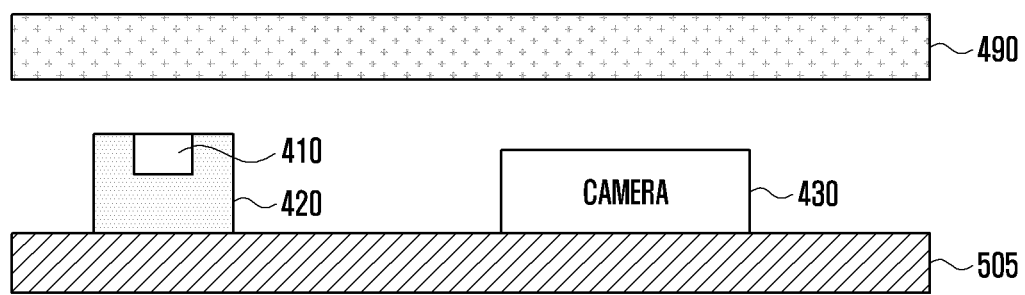
FIG. 5 illustrates a configuration of a partial rear side of an electronic device according to various embodiments of the disclosure.

FIG. 5 illustrates a configuration of a partial rear side of an electronic device according to various embodiments of the disclosure.

Referring to FIG. 5, the electronic device 400 according to various embodiments of the disclosure may be equipped with a light emitter 410, biometric sensor 420, and camera 430 on a PCB 505. An identical transparent member 490 may be disposed on the light emitter 410, biometric sensor 420, and camera 430. According to an embodiment of the disclosure, the light emitter 410 may be equipped in the biometric sensor 420. The biometric sensor 420 including the light emitter 410 and the camera 430 may be disposed on the PCB 505 in a first direction (e.g., horizontal direction) by being displaced with a predetermined distance.

Figure 6:
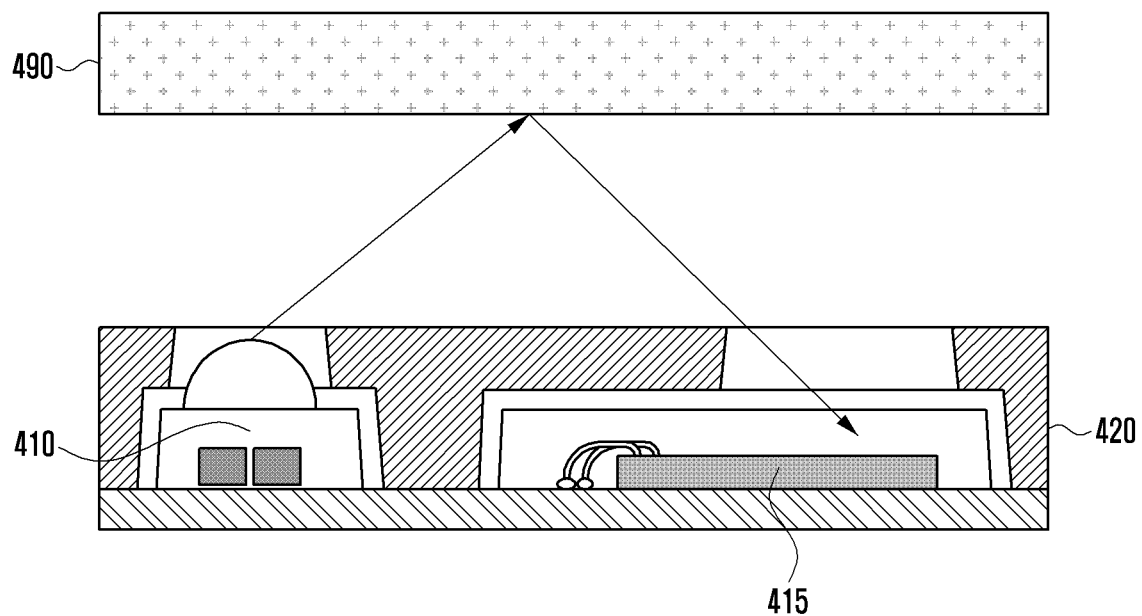
FIG. 6 illustrates a configuration of a biometric sensor installed in an electronic device according to various embodiments of the disclosure.

FIG. 6 illustrates a configuration of a biometric sensor installed in an electronic device according to various embodiments of the disclosure.

Referring to FIG. 6, the biometric sensor 420 of the electronic device 400 according to various embodiments of the disclosure may be disposed under the transparent member 490. The biometric sensor 420 may include a light emitter 410 and a light receiver 415. Namely, the light emitter 410 and the light receiver 415 may be equipped in one biometric sensor 420. If the light emitter 410 is equipped in the biometric sensor 420, the light emitted by the light emitter 410 is reflected by the transparent member 490 and received by the light receiver 415. The processor 480 can estimate a light amount of the light emitter 410 from the light received by the light receiver 415. According to an embodiment of the disclosure, the light emitted by the light emitter 410 of the biometric sensor 420 can be reflected by the transparent member 490. The reflected light may pass through the light receiver 415 (e.g., photodiode) of the biometric sensor 420. An amount of incident light may be proportional to the amount of light emitted by the light emitter 410. Because the value of an incident light amount has a large scale (e.g., about 50~70% of total light amount when measuring with a finger), a change of refraction amount adsorbed by the transparent member 490 may be a small portion. For example, if the amount of light emitted by the light emitter 410 is different from a predetermined reference value, the processor 480 can compensate for the light amount by controlling an electric current of the light emitter 410. In the meantime, the light emitter 410 equipped in the biometric sensor 420 can emit light widely in a light characteristic so that the transparent member 490 can perform a total reflection uniformly.

Figure 7:
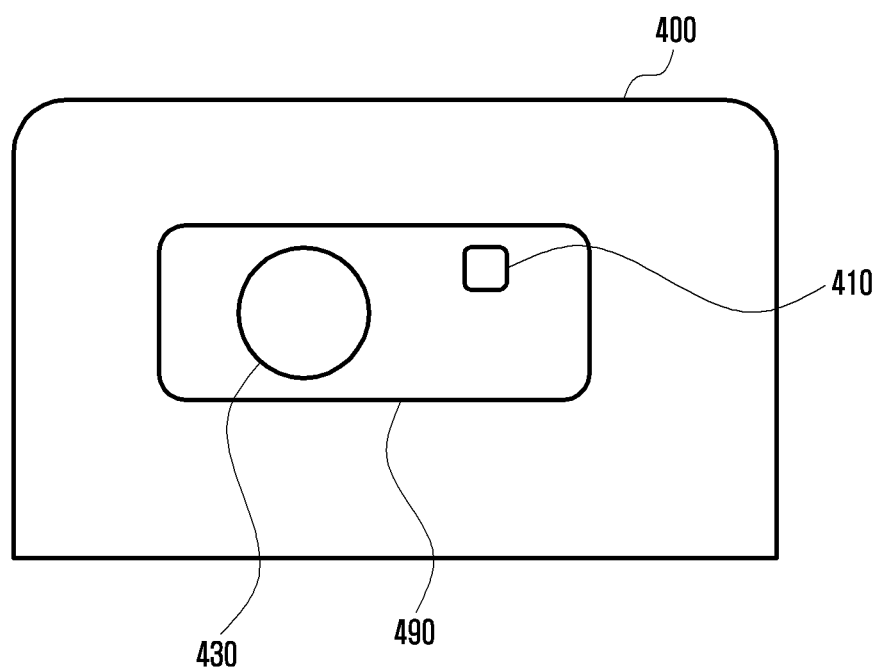
FIG. 7 illustrates a configuration of a partial rear side of an electronic device according to various embodiments of the disclosure.

FIG. 7 illustrates a configuration of a partial rear side of an electronic device according to various embodiments of the disclosure.

Referring to FIG. 7, the light emitter 410 of the electronic device 400 according to various embodiments of the disclosure may be separately equipped without being installed in the biometric sensor 420. The light emitter 410 can be disposed under the transparent member 490 by being displaced from the camera 430 with a predetermined distance. The camera 430 can operate as a light receiver corresponding to the light emitter 410. In this case, the light emitter 410 can selectively use a wavelength range receivable by the camera 430. Namely, the wavelength of light emitted by the light emitter 410 may include a part of a wavelength range passable by a color filer of pixels in the camera 430. For example, the light emitter 410 may include at least one of an IR LED having about 880 nm wavelength, red LED having about 660 nm wavelength, green LED having about 550 nm wavelength, and blue LED having about 440 nm wavelength.

Figure 8:
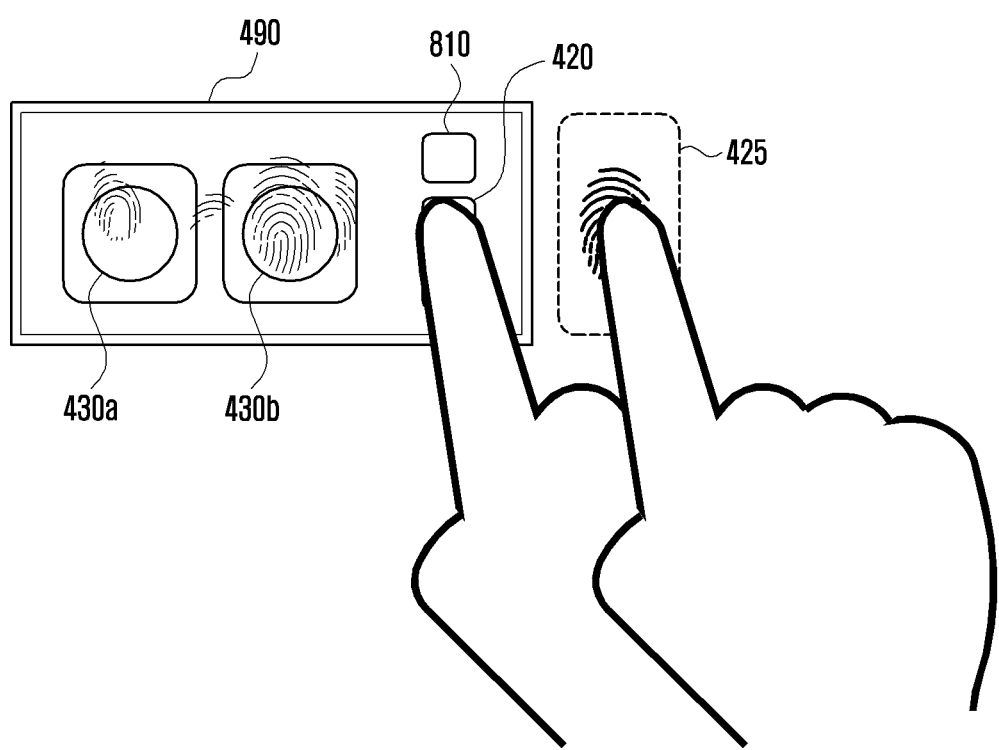
FIG. 8 illustrates a configuration of a partial rear side of an electronic device according to various embodiments of the disclosure.

FIG. 8 illustrates a configuration of a partial rear side of an electronic device according to various embodiments of the disclosure.

Referring to FIG. 8, the electronic device 400 according to various embodiments of the disclosure may include a camera flashlight 810, biometric sensor 420, a fingerprint sensor 425, a first camera 430a, a second camera 430b, and a transparent member 490. The camera flashlight 810 can perform a function of the light emitter 410 shown in FIG. 7. According to an embodiment of the disclosure, the light emitter 410 shown in FIG. 7 may be included in the biometric sensor 420.

If the biometric sensor 420 or the fingerprint sensor 425 is located adjacent to the first camera 430a and second camera 430b, a foreign substance (e.g., oil or dust on a finger according to fingerprint recognition) can be adsorbed by the transparent member 490 of the first camera 430a or the second camera 430b while a user touches the biometric sensor 420 or the fingerprint sensor 425. For example, in the case of obtaining a correct and clear image and extracting information of the obtained image, such as, an augmented reality (AR) technology or Bixby vision (or vision intelligence), if a foreign substance (e.g., oil or dust on a user's finger) is adsorbed by the transparent member 490 of the first camera 430a and the second camera 430b, a clear image cannot be obtained. For example, if foreign substance adsorption information of the transparent member 490 of the camera 430 including a first camera 430a and a second camera 430b is informed to a user of the electronic device 400 and the foreign substance is removed by the user, a clear image can be obtained.

Referring to FIG. 8, the first camera 430a (e.g., in the case that the camera of FIG. 4 is configured with a dual camera) may include a wide angle camera. The second camera 430b may include a narrow angle camera. For example, if a user of the electronic device 400 perform a zoom-in in a state of the first camera 430a being switched on and the first camera 430a reaches a predetermined image size after the zoom-in, switching to the second camera 430b may be performed automatically. In this case, the first camera 430a and the second camera 430b may perform different operations because of an issue of electric current consumption. Accordingly, in various embodiments of the disclosure, a foreign substance adsorbed by the transparent member 490 can be detected by selectively switching one of the first camera 430a or second camera 430b according to a zoom-in ratio. Further, by switching on the first camera 430a and second camera 430b simultaneously or sequentially, it can be identified whether a foreign substance is adsorbed by the first camera 430a or the second camera 430b.

According to various embodiments of the disclosure, the light emitter 410 shown in FIG. 7 or the camera flashlight 810 shown in FIG. 8 can be equipped at a specific location where a foreign substance can be detected, such as a location between the first camera 430a and the second camera 430b, or at an upper side, a lower side, a left side, or right side.

Figure 9:
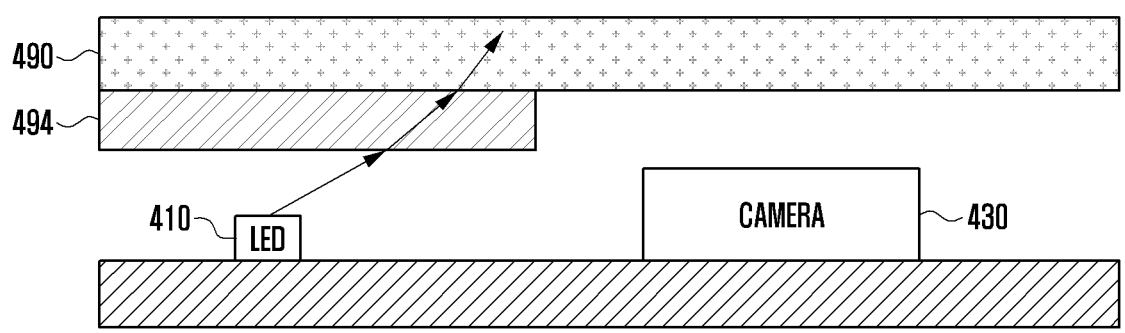
FIG. 9 illustrates a buffer window disposed between a light emitter and a transparent member of an electronic device according to various embodiments of the disclosure.

FIG. 9 illustrates a buffer window disposed between a light emitter and a transparent member of an electronic device according to various embodiments of the disclosure.

Referring to FIG. 9, a buffer window 494 may be disposed between the light emitter 410 and the transparent member 490 of the electronic device 400 according to various embodiments of the disclosure. For example, the buffer window 494 can be combined with a lower part of the transparent member 490 and configured so that light emitted by the light emitter 410 passes through the transparent member 490 and performs a total reflection. The buffer window 494 can help an inflow of light into the transparent member 490 by changing a refracting angle of the light emitted by the light emitter 410. The buffer window 494 may include at least one of a transparent lens, flat lens, and concave lens.

Figure 10:
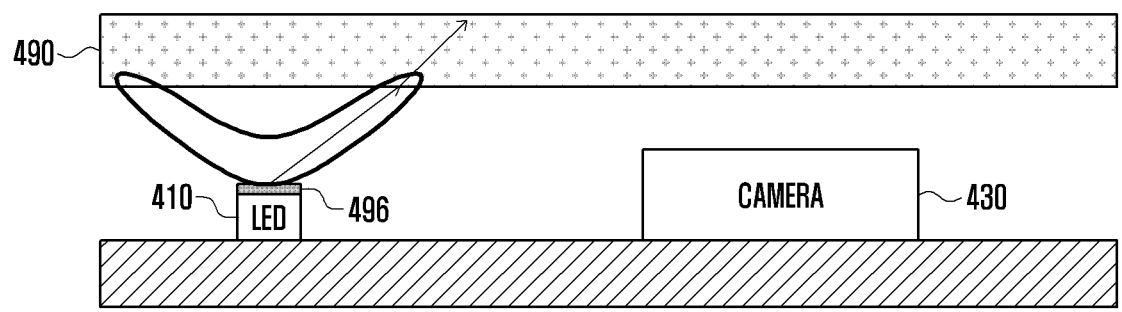
FIG. 10 illustrates a diffuser disposed between a light emitter and a transparent member of an electronic device according to various embodiments of the disclosure.

FIG. 10 illustrates a diffuser disposed between a light emitter and a transparent member of an electronic device according to various embodiments of the disclosure.

Referring to FIG. 10, a diffuser 496 may be disposed between the light emitter 410 and the transparent member 490 of the electronic device 400 according to various embodiments of the disclosure. For example, the diffuser 496 can be combined with an upper part of the light emitter 410 and configured to diffuse the light emitted by the light emitter 410 in the transparent member 490 and perform a total reflection. The diffuser 496 can help an inflow of light into the transparent member 490 by diffusing the light emitted by the light emitter 410 in the right and left side directions.

Figure 11:
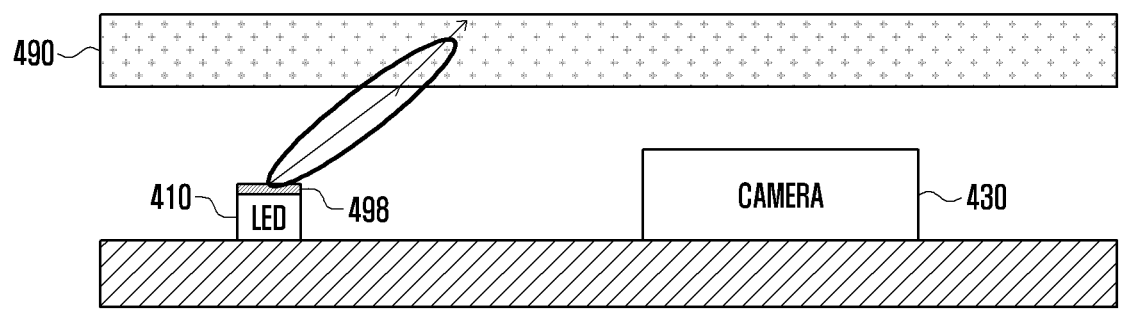
FIG. 11 illustrates a diffractive optical element (DOE) disposed between a light emitter and a transparent member of an electronic device according to various embodiments of the disclosure.

FIG. 11 illustrates a diffractive optical element (DOE) disposed between a light emitter and a transparent member of an electronic device according to various embodiments of the disclosure.

Referring to FIG. 11, the DOE 498 may be disposed between the light emitter 410 and the transparent member 490 of the electronic device 400 according to various embodiments of the disclosure. For example, the DOE 498 can be combined with an upper part of the light emitter 410 and configured to perform a total reflection by passing light emitted by the light emitter 410 through the transparent member 490. The DOE 498 can help an inflow of light into the transparent member 490 by emitting the light from the light emitter 410 in one direction. For example, the DOE 498 may configured with a film (or layer) determining the direction of light by using a light refraction characteristic.

Figure 12:
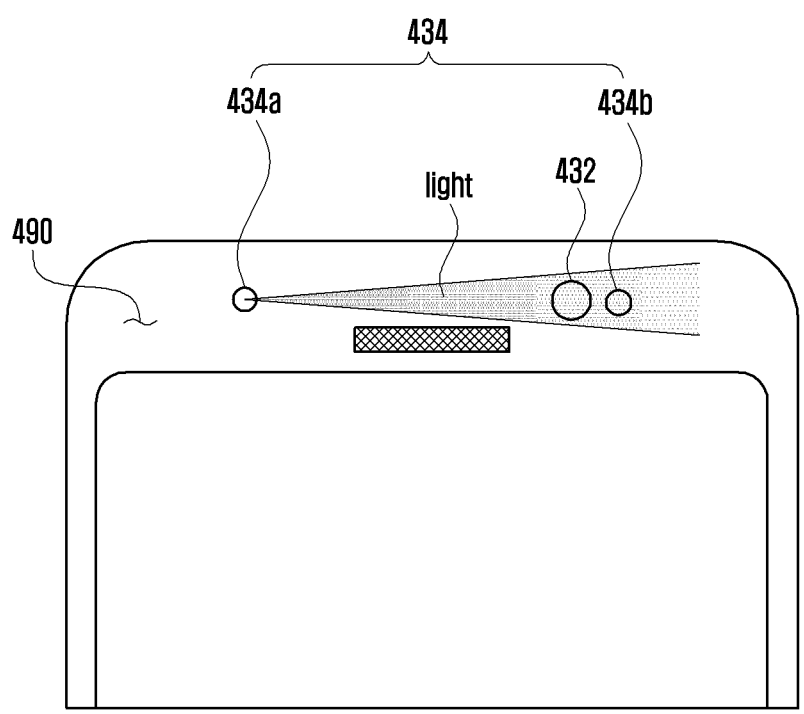
FIG. 12 illustrates a configuration of a partial front side of an electronic device according to various embodiments of the disclosure.

FIG. 12 illustrates a configuration of a partial front side of an electronic device according to various embodiments of the disclosure.

Referring to FIG. 12, the electronic device 400 according to various embodiments of the disclosure may include a first camera 432, second camera 434, and transparent member 490. The first camera 432 may include an RGB camera. The second camera 434 may include an IR camera. The second camera 434 may include an IR light emitter 434*a* and an IR light receiver 434*b*. For example, light emitted by the IR light emitter 434*a* can pass a partial area of a filter of the first camera 432 and a partial area of a filter of the IR light receiver 434*b*. By this, the processor 480 can detect a foreign substance (oil or dust on a user's finger) adsorbed by the transparent member 490 on the IR light receiver 434*b* of the first camera 432 or the second camera 434.

Figure 13:
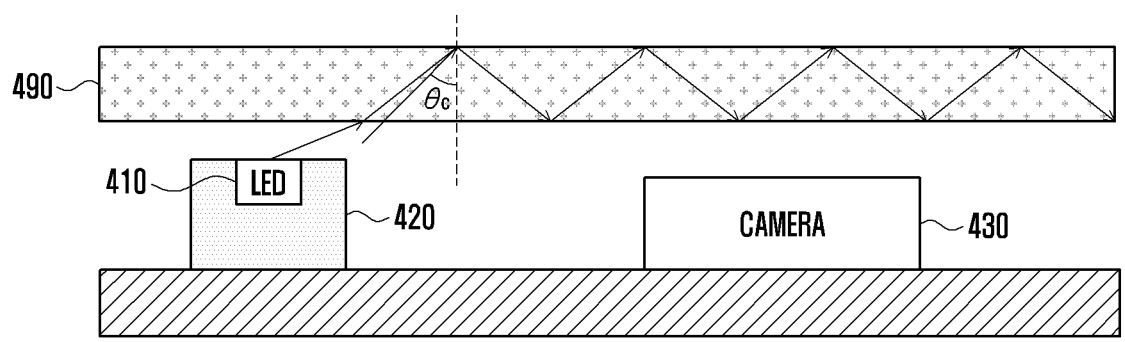
FIG. 13 illustrates a refractive index of a transparent member of an electronic device according to various embodiments of the disclosure.

FIG. 13 illustrates a refractive index of a transparent member of an electronic device according to various embodiments of the disclosure.

Referring to FIG. 13, the electronic device 400 according to various embodiments of the disclosure can detect a foreign substance (oil or dust on a user's finger) adsorbed on an outer surface of the transparent member 490 by using the light emitter 410 equipped in the biometric sensor 420 and the camera 430 performing a function of light receiver. For example, light emitted by the light emitter 410 may flow into the transparent member 490 through various paths. With reference to FIG. 13, if the light emitted by the light emitter 410 enters the transparent member 490 with an angle greater than a critical angle θc, the light having an incident angle greater than the critical angle θc is reflected totally and may not proceed to the camera 430. For example, because a refractive index of the transparent member 490 for a red LED having about 660 nm wavelength is about 1.51 and a refractive index of an outer air is about 1.01, light having an incident angle greater than about 41.4° can satisfy a total reflection condition. The total reflection condition may have a very small difference in a visible light range. For example, the refractive index of the transparent member 490 for a green LED having about 550 nm wavelength may be 1.512, the refractive index of the transparent member 490 for a blue LED having about 440 nm wavelength may be 1.513, and the refractive index of the transparent member 490 for a red LED having about 660 nm wavelength may be 1.511. The refractive index may differ according to a wavelength and a type of medium. For example, the refractive index of moisture (water) is 1.33, the refractive index of oil is 1.47, the refractive index of glass is 1.51, the refractive index of flint glass is 1.60, the refractive index of silver is 2.06, and the refractive index of diamond is 2.42.

Figure 14:
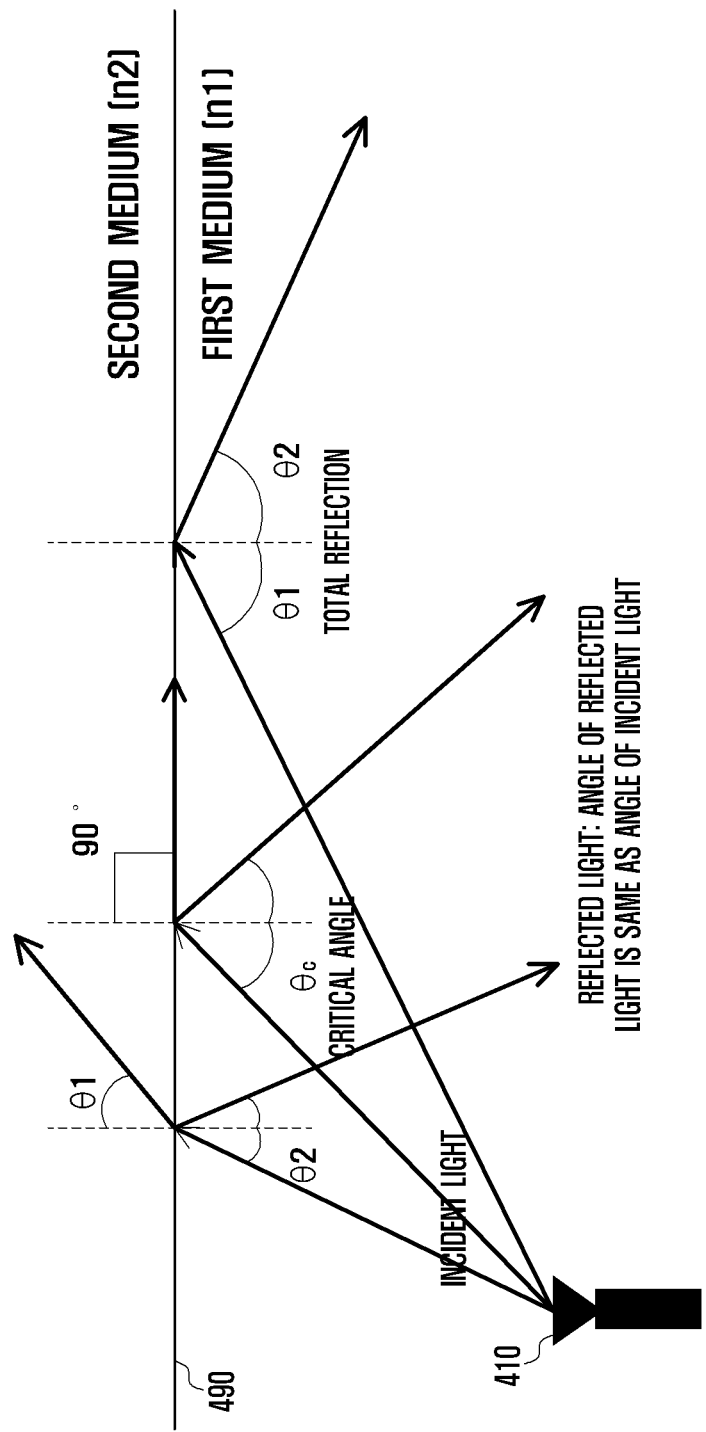
FIG. 14 illustrates a refractive index of a transparent member of an electronic device according to various embodiments of the disclosure.

FIG. 14 illustrates a refractive index of a transparent member of an electronic device according to various embodiments of the disclosure.

Referring to FIG. 14, the following Equation 1 (Snell's law) may be established for a boundary of 2 media (first medium n1 and second medium n2) located in a proceeding direction of light emitted from the light emitter 410 to the transparent member 490.

$$n_1 \sin\theta_1 = n_2 \sin\theta_2 \quad \text{Equation 1}$$

For example, the following Equation 2 may be established for an incident angle (critical angle) starting a total reflection of light emitted from the light emitter 410 to the transparent member 490 based on the refractive angle of the air (or vacuum) because the refractive angle of the air is 1.

$$\sin\theta c = 1/n$$

$$\theta c = \sin^{-1}(1/n) \quad \text{Equation 2}$$

For example, because the refractive index of the transparent member 490 is 1.51, the following Equation 3 may be established for an incident angle (critical angle) at a boundary between the transparent member 490 and the air. Namely, light having an incident angle greater than 41.4° may satisfy a total reflection condition.

$$\theta_1 = \theta_2 = \sin^{-1}(1/1.51) = 41.4° \quad \text{Equation 3}$$

Here, the incident angle (critical angle) of the transparent member 490 is an example of a window glass or a cover glass equipped in the electronic device 400, and members having various other media can be equipped in the electronic device 400. For example, based on a red LED having about 660 nm wavelength for a boundary between the transparent member 490 and the air, all the light having an incident angle greater than 41.4° may escape to a side of the transparent member 490. The light that escaped to the side of the transparent member 490 may not proceed to the camera 430.

Figure 15:
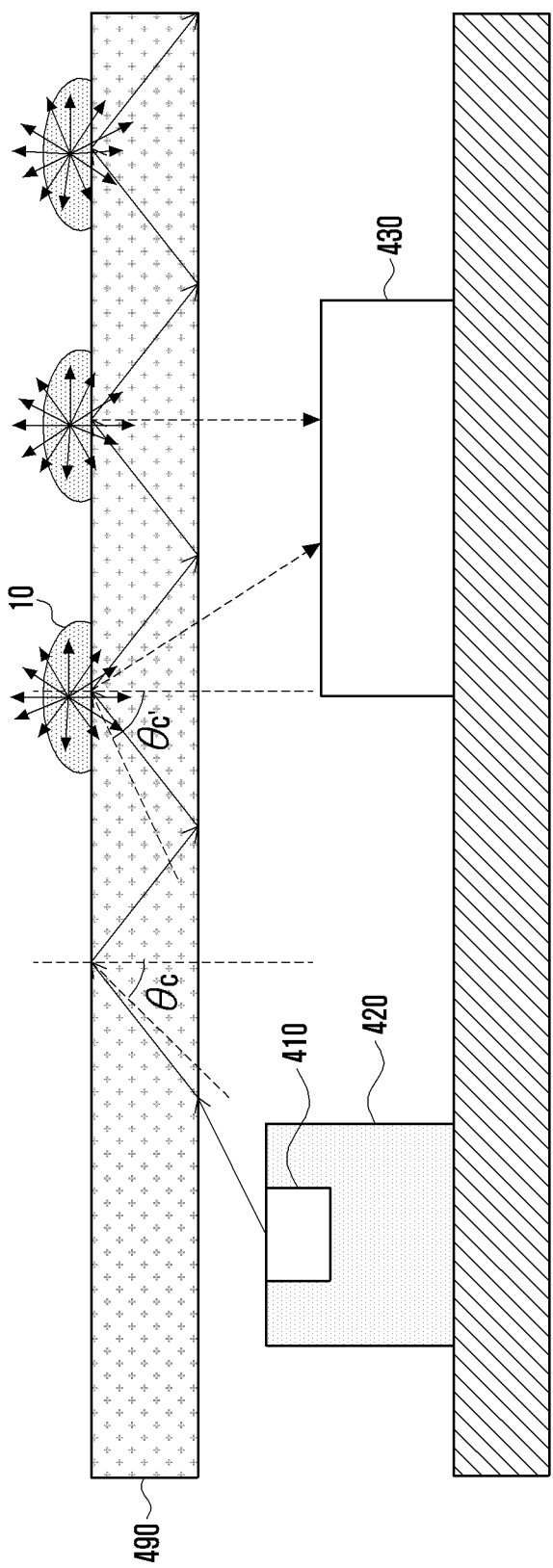
FIG. 15 illustrates an operation for detecting a foreign substance adsorbed by a transparent member of an electronic device according to various embodiments of the disclosure.

FIG. 15 illustrates an operation for detecting foreign substances adsorbed by a transparent member of an electronic device according to various embodiments of the disclosure.

Referring to FIG. 15, a foreign substance 10, such as a fingerprint including oil and moisture may be adsorbed by an outer surface of the transparent member 490. The refractive index of the foreign substance 10 may be 1.47 for oil and 1.33 for moisture (water). In this case, a critical angle θc' of an area where a foreign substance is adsorbed by the outer surface of the transparent member 490 may be greater than a critical angle θc of an area where the foreign substance is not adsorbed by the outer surface of the transparent member 490. For example, the critical angles satisfying a total reflection for the boundary between the transparent member 490 and the foreign substance 10 may be respectively 78.5° (sin θ=1.47/1.51) and 62.4° (sin θ=1.33/1.51). In this case, light having an incident angle smaller than 78.5° and 62.4° among light emitted by the light emitter 410 can penetrate into the foreign substance 10. The light that penetrates the foreign substance 10 may be scattered by particles in the foreign substance 10 when being reflected at the boundary between the transparent member 490 and the foreign substance 10. The scattered light can proceed to the camera 430 and can be captured by the camera 430.

Figure 16:
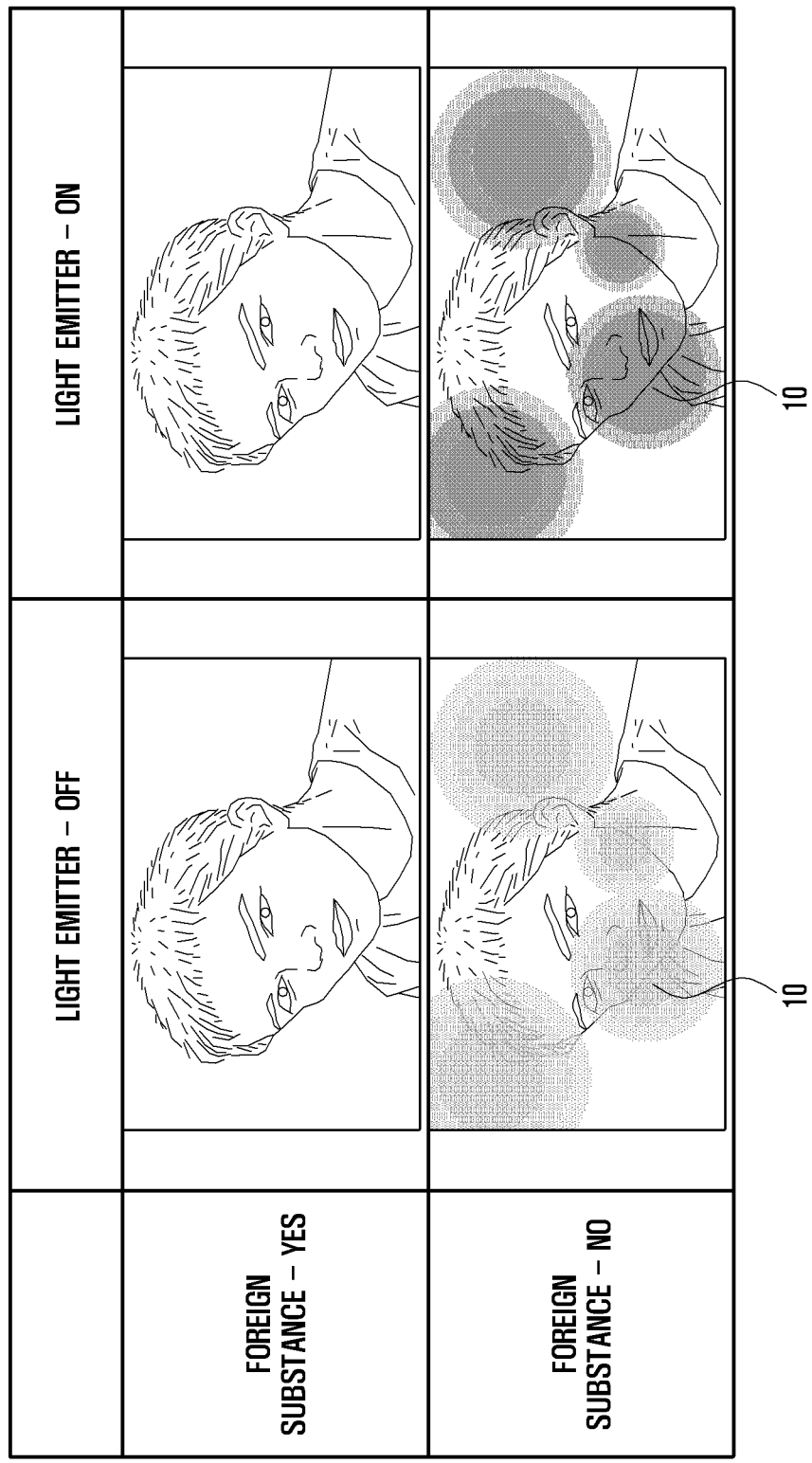
FIG. 16 illustrates images according to a foreign substance adsorbed by a transparent member and an on/off state of a light emitter in an electronic device according to various embodiments of the disclosure.

FIG. 16 illustrates images according to a foreign substance adsorbed by a transparent member and an on/off state of a light emitter in an electronic device according to various embodiments of the disclosure.

Referring to FIG. 16, a color of an image obtained from an external object may differ according to adsorption of a foreign substance on the transparent member 490 and switching on/off the light emitter 410. For example, if a foreign substance 10 is not adsorbed by the transparent member 490, colors of images captured and obtained according to switching on/off the light emitter 410 may have no difference. However, if a foreign substance 10 is adsorbed by the transparent member 490, the colors of images captured and obtained according to switching on/off the light emitter 410 may have a difference. For example, if a foreign substance 10 is adsorbed by the transparent member 490 and the light emitter 410 is switched off, an image area where the foreign substance 10 is adsorbed may look cloudy. Further, if a foreign substance 10 is adsorbed by the transparent member 490 and the light emitter 410 is switched on, an image area where the foreign substance 10 is adsorbed may have a darker color than other areas.

FIG. 17 illustrates difference values of color information of images according to a foreign substance adsorbed by a transparent member and an on/off state of a light emitter in an electronic device according to various embodiments of the disclosure.

Referring to FIG. 17, color information of an image obtained from an external object may differ according to the adsorption of a foreign substance on the transparent member 490 and switching on/off of the light emitter 410. For example, if a foreign substance is not adsorbed by the transparent member 490, a difference value of color information of images captured and obtained according to switching on/off the light emitter 410 may be 0.44%. Namely, if a foreign substance is not adsorbed by the transparent member 490, a difference value of color information of images obtained in the case of switching off the light emitter 410 and in the case of switching on the light emitter 410 may be 0.44%. However, if a foreign substance is adsorbed by the transparent member 490, the difference value of color information of images obtained according to switching on/off the light emitter 410 may be 4.41%. Namely, if a foreign substance is not adsorbed by the transparent member 490, the difference value of color information of images obtained in the case of switching off the light emitter 410 and in the case of switching on the light emitter 410 may be 4.41%. The color information may be extracted differently according a color of the light emitter 410. For example, the difference value of color information may have a value of red color information extracted and added up from all the images captured and obtained by the camera 430. Further, the difference value of color information may have a value of other color information (e.g., blue and green) extracted and added up from all the images captured and obtained by the camera 430.

Figure 18:
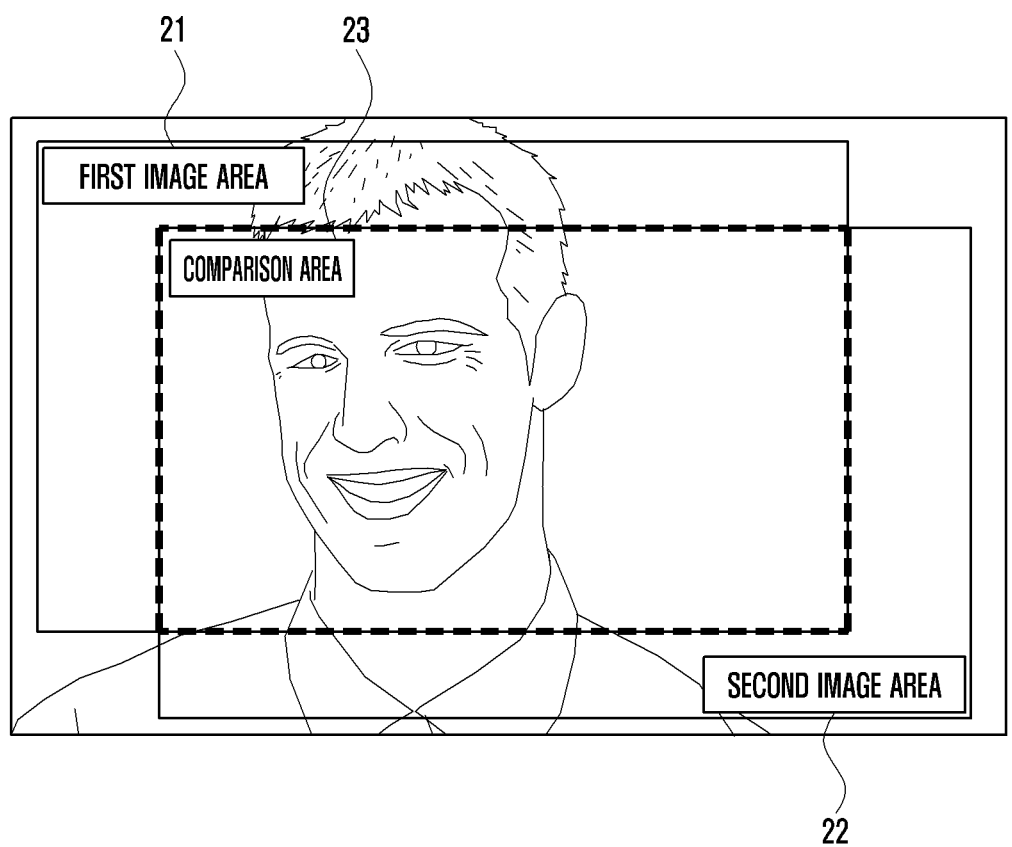
FIG. 18 illustrates a color information difference of an image in an electronic device according to various embodiments of the disclosure.

FIG. 18 illustrates a color information difference of an image in an electronic device according to various embodiments of the disclosure.

Referring to FIG. 18, color information of a first image area 21 and a second image area 22 can be extracted through a common area 23 overlapped by the first image area 21 and the second image area 22. For example, if there is a difference between photographing areas of the first image area 21 and the second image area 22 when comparing a first image and a second image captured by the camera 430, there may be a difference of color information between the first image area 21 and the second image area 22 even though a foreign substance is not adsorbed by the transparent member 490. In this case, the color information of the common area 23 can be extracted by finding out characteristic points from the first image area 21 and the second image area 22 and extracting the common area 23 overlapped by the first image area 21 and the second image area 22. For example, when the comparison area definition unit 482 of the processor 480 extracts color information of at least 2 images captured by the camera 430, a common area having the at least 2 images can be defined. The comparison area definition unit 482 can define a commonly captured area in order to compare color information of the at least 2 images. For example, the comparison area definition unit 482 can extract a common area of at least 2 images captured by the camera 430 through acceleration information. The comparison area definition unit 482 may have an algorithm for identifying a movement size based on acceleration sensor information of a first captured image and acceleration sensor information of a second captured image and extracting the common area according to the movement size. According to an embodiment of the disclosure, the common area may have a predetermined area value stored in the memory 470. According to another embodiment of the disclosure, the comparison area definition unit 482 can identify a common area of at least 2 images captured by the camera 430 through a recognizer in the camera 430. For example, if the image captured by the camera 430 is a landscape, the comparison area definition unit 482 can identify the sky and the earth. If the image captured by the camera 430 is a portrait, the comparison area definition unit 482 can identify at least one of a face of an identical person, clothes of the identical person, and another body part of the identical person through face recognition. If the image captured by the camera 430 is a letter or a barcode, the comparison area definition unit 482 can identify an area of extracting the letter or the barcode. If the image captured by the camera 430 is an object, the comparison area definition unit 482 can identify an object, such as a bag, a desk, a desk lamp, or the like.

Figure 19:
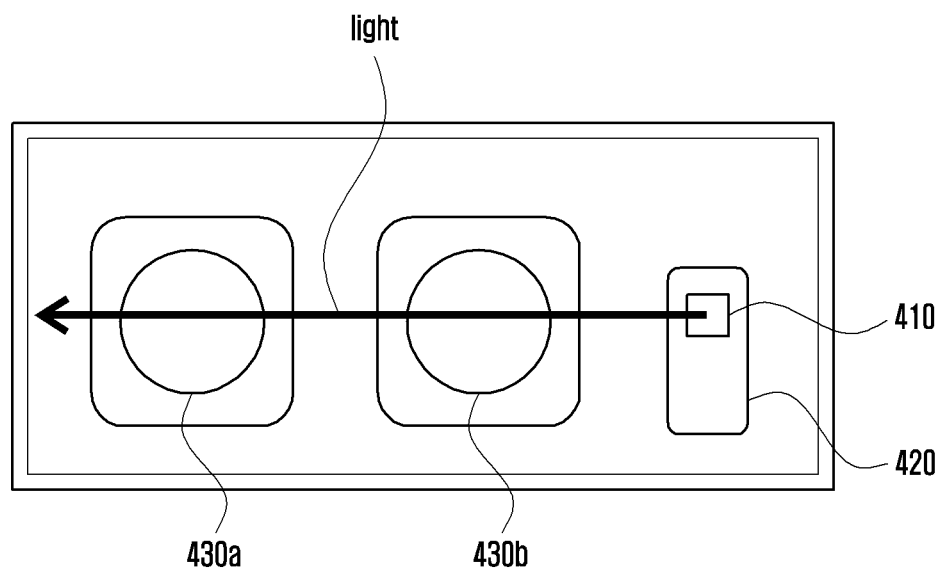
FIG. 19 illustrates increasing an accuracy of detecting a foreign substance in an electronic device according to various embodiments of the disclosure.

FIG. 19 illustrates increasing an accuracy of detecting a foreign substance in an electronic device according to various embodiments of the disclosure.

Referring to FIG. 19, the electronic device 400 according to various embodiments of the disclosure may include a light emitter 410, biometric sensor 420, first camera 430a, second camera 430b, and transparent member 490.

If areas for detecting a foreign substance of the first camera 430a and the second camera 430b are located at the same path, the accuracy of detecting adsorption of a foreign substance by an outer part of the transparent member 490 may increase. For example, if a foreign substance is adsorbed by the transparent member 490 of the second camera 430b located closer to the light emitter 410, an amount of light proceeding to the first camera 430a located farther from the light emitter 410 may decrease. By this, the accuracy of detecting a foreign substance by the first camera 430a located farther from the light emitter 410 may decrease. Accordingly, the amount of light proceeding to the first camera 430a located farther from the light emitter 410 can be estimated by using a difference value of color information of the foreign substance adsorbed by the transparent member 490 of the second camera 430b located closer to the light emitter 410. By this, the accuracy of detecting a foreign substance adsorbed by the transparent member 490 can be increased by compensating a signal when the first camera 430a located farther from the light emitter 410 detects a foreign substance or by adjusting the amount of light of the light emitter 410 for the first camera 430a.

Figure 20:
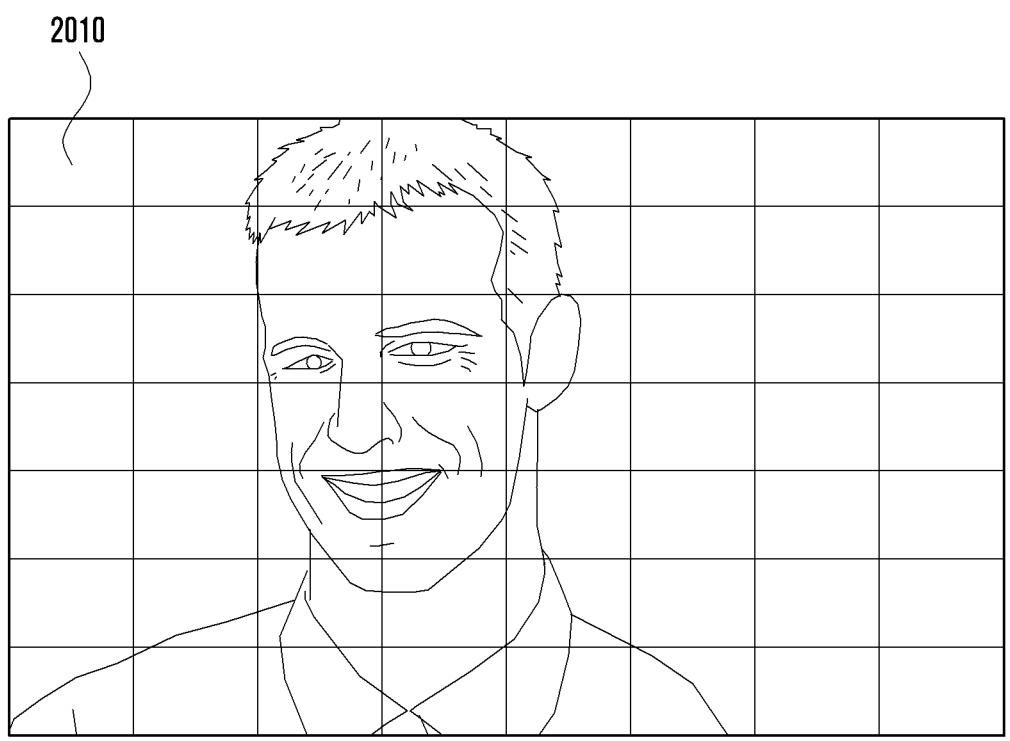
FIG. 20 illustrates increasing an accuracy of detecting a foreign substance in an electronic device according to various embodiments of the disclosure.

FIG. 20 illustrates increasing an accuracy of detecting a foreign substance in an electronic device according to various embodiments of the disclosure.

Referring to FIG. 20, the electronic device 400 according to various embodiments of the disclosure can analyze an image captured by the camera 430 by dividing the image into each area 2010 in order to improve the accuracy of detecting a foreign substance adsorbed by the transparent member 490. The number of areas 2010 divided in the image can be increased up to the maximum number of pixels (e.g., 256) of an image sensor installed in the camera 430. Similarly, the method of analyzing an image by dividing the image into each area 2010 has the following advantages. For example, if the light emitted by the light emitter 410 is directly reflected by a subject having a high reflectivity, such as a mirror, color information differs greatly at a specific part even though a foreign substance is not adsorbed by the transparent member 490. In this case, if the reflection of light in a specific area of the image has a difference of color information greater than a predetermined reference value, the processor 480 can determine that a foreign substance is not adsorbed on the transparent member 490 corresponding to the specific area. Further, if there is no inconvenience for a user to identify an image captured by the camera 430 because a small foreign substance hardly recognizable by the user is detected or the foreign substance is detected at an outer part of the image, an unnecessary notification of foreign substance adsorption to the user can be omitted by ignoring the detection of the foreign substance. Further, if the image is divided into a plurality of areas 2010, it may be convenient to remove a color for a specific area of an image (photo and video) captured from an external object in the case that a crack (e.g., scratch) is formed on the transparent member 490. Further, if the image is divided into a plurality of areas 2010, the processor can easily detect an area of crack formation on the transparent member 490 in the case that the crack exists on the transparent member 490 and an abnormal image quality is continuously obtained from a specific area of the image (photo and video) captured from the external object.

Figure 21:
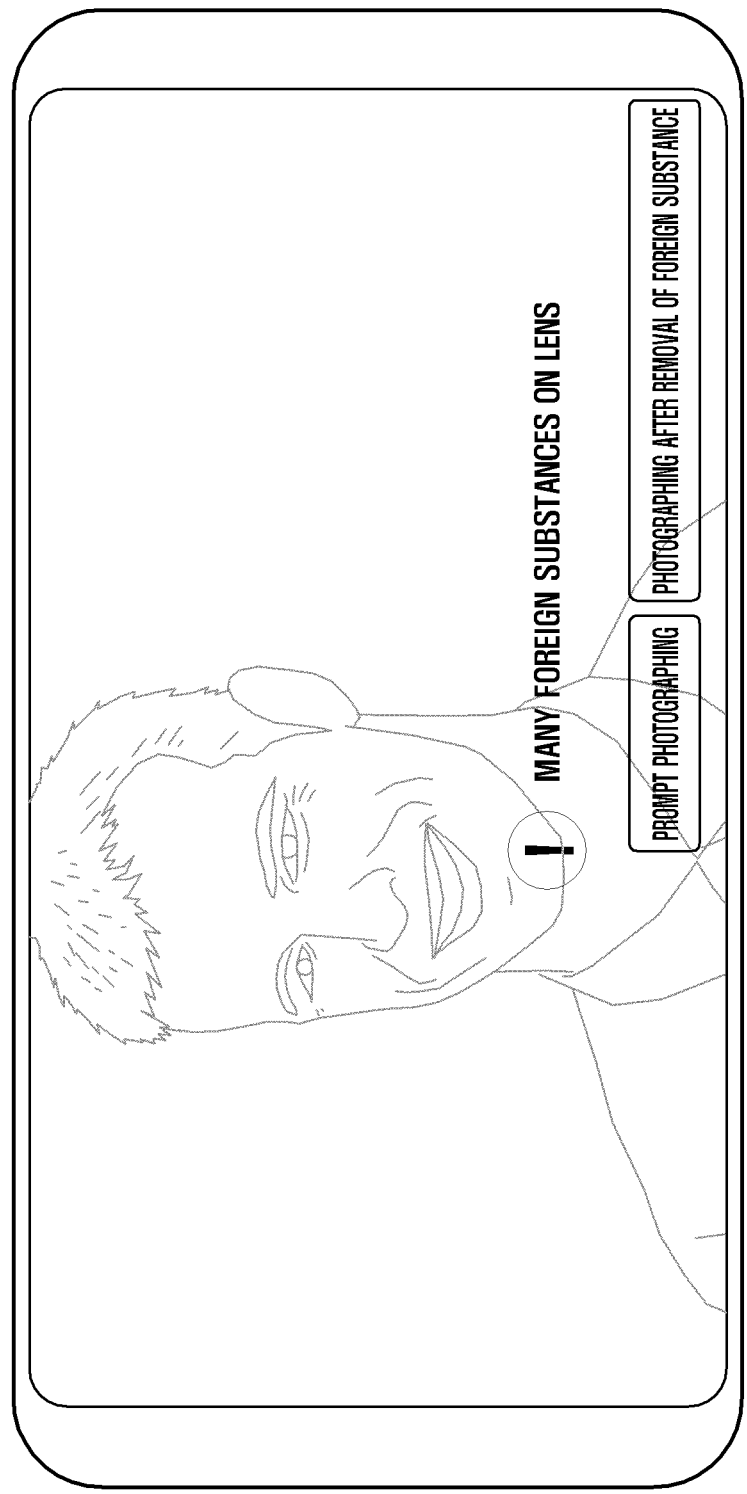
FIG. 21 illustrates informing about a foreign substance adsorbed by a transparent member of an electronic device according various embodiments of the disclosure.

FIG. 21 illustrates informing about a foreign substance adsorbed by a transparent member of an electronic device according various embodiments of the disclosure.

Referring to FIG. 21, if a foreign substance (e.g., oil or dust on a user's finger) is adsorbed by the transparent member 490 of the camera, the electronic device 400 according to various embodiments of the disclosure can provide a UI for informing about detected adsorption information through the display 440. For example, the UI can provide a warning message informing about the adsorption of a foreign substance on the camera 430 (e.g., "Many foreign substances on lens" or "Image distortion may occur"). According to various embodiments of the disclosure, if a foreign substance is adsorbed by the transparent member 490 of the camera 430, the electronic device 400 can inform a user of the electronic device 400 through a voice or a vibration. Further, the UI can provide a menu for prompt photographing and a menu for photographing after removal of a foreign substance. Further, if the image is divided into a plurality of areas (e.g., areas 2010 of FIG. 20), the UI can inform the user of the electronic device 400 about an adsorption area of a foreign substance.

Figure 22:
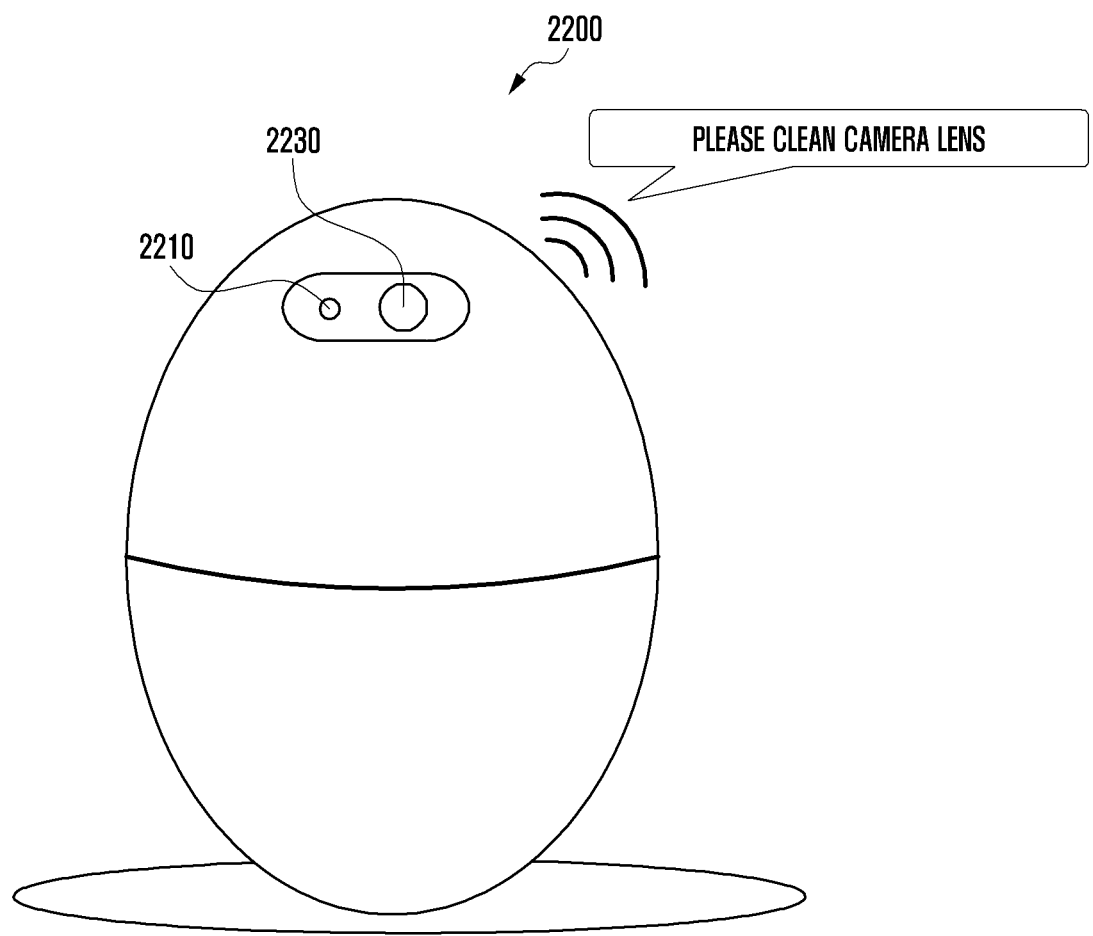
FIG. 22 illustrates various electronic devices equipped with a camera according to various embodiments of the disclosure.

FIG. 22 illustrates various electronic devices equipped with a camera according to various embodiments of the disclosure.

Referring to FIG. 22, the electronic device 2200 may include at least one of a home hub, sleep monitoring and managing device, drone, robot, and home appliance. Besides these, other electronic devices having a light emitter 2210 (e.g., light emitter 410 according to various embodiments of the disclosure) and a camera 2230 (e.g., camera 430 according to various embodiments of the disclosure) may be further included.

According to various embodiments of the disclosure, the camera 2230 equipped in the electronic device 2200 can perform a function of monitoring a specific target. For example, if the electronic device 2200 is a home hub, the camera 2230 may be a device for monitoring a coming or going of a person or a security device for detecting an intrusion. If the electronic device 2200 is a sleep monitoring device, the camera 2230 may be a device for monitoring a user's sleeping state. If the electronic device 2200 is a refrigerator, the camera 2230 may be a device for monitoring foods in the refrigerator, or informing existence or a shelf life of food. If the electronic device 2200 is an air conditioner, the camera 2230 may be a device for monitoring a location of a user and operating so that a cool wind is directed to the user. It may be difficult for a user to frequently determine the camera 2230 of the above various electronic devices 4220 and remove a foreign substance. However, adsorption information of a foreign substance can be easily detected by using the light emitter 2210 (e.g., light emitter 410 of FIG. 4) and the camera 2230 (e.g., camera 430 of FIG. 4) according to various embodiments of the disclosure. According to various embodiments of the disclosure, a device having an image processing function can capture each image by switching on/off the light emitter 2210, comparing information of each image, and providing a user with a difference of color information according to the comparison result. A device having no image processing function can capture each image by switching on/off the light emitter 2210, transmitting the captured image to a device having image processing (e.g., mobile terminal and server) to compare each image, and providing a user with a difference of color information according to the comparison result.

Figure 23:
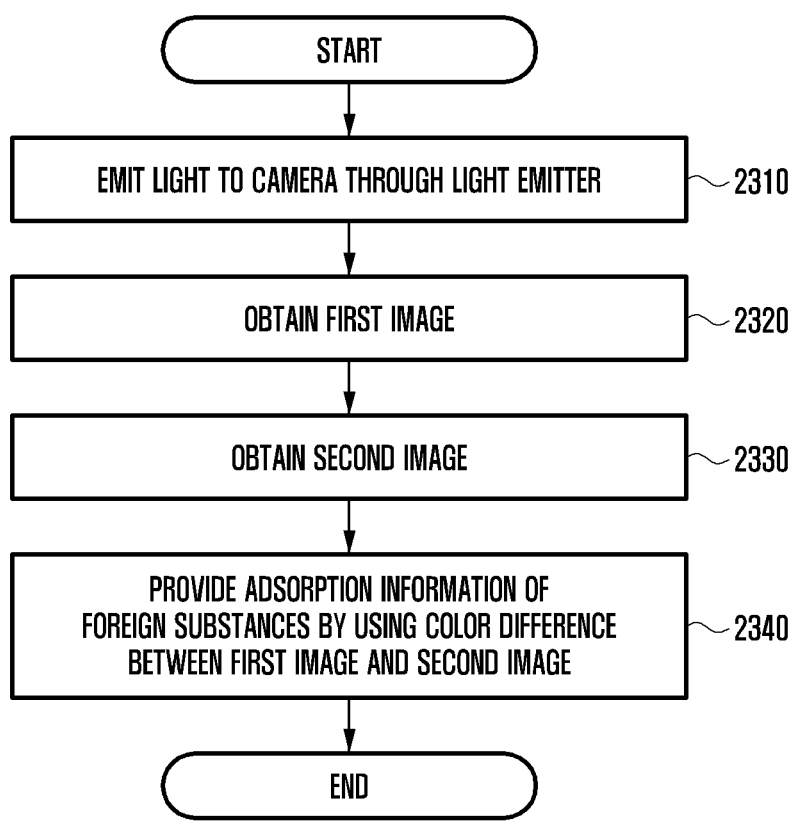
FIG. 23 is a flowchart illustrating a method for providing adsorption information of a foreign substance adsorbed by a transparent member of a camera in an electronic device according to various embodiments of the disclosure.

FIG. 23 is a flowchart illustrating a method for providing adsorption information of a foreign substance adsorbed by a transparent member of a camera in an electronic device according to various embodiments of the disclosure.

Referring to FIG. 23, at operation 2310, if a photographing mode of the camera 430 starts, the processor 460 controls the light emitter 410 to emit light towards the camera 430 disposed under the transparent member 490.

At operation 2320, the processor 480 obtains a first image of an external object by using a difference of light refracting angles between the transparent member 490 formed with a first medium and the second medium formed at an outer part of the transparent member 490 by using the camera 430 while at least one part of the light emitted by the light emitter 410 is transmitted through an inner part of a second medium. In this case, the camera 430 can obtain the first image of the external object by switching on or off.

At operation 2330, the processor 480 obtains a second image of the external object by using the camera 430. In this case, the camera 430 can obtain the second image of the external object by switching on or off.

At operation 2340, the processor 480 provides foreign substance information of a third medium adsorbed on at least one part of an outer surface of the transparent member 490 by using a color difference between at least one partial area of the first image and at least one partial area of the second image.

At operation 2340, the processor 480 informs a user of the electronic device 400 about adsorption information of the foreign substance by using at least one of a UI through a display, a guide voice through an audio output unit 450, and a vibration through a vibration output unit 460.

According to various embodiments of the disclosure, the processor 480 can extract a common area (e.g., common area 23 of FIG. 18 (or comparison area)) of the first image and the second image obtained by the camera 430. The processor 480 can extract color information for the extracted common area. For example, if there is a color difference between photographing areas of the first image and the second image when comparing the first image and the second image captured by the camera 430, there can be a difference of color information between the first image and the second image even though a foreign substance is not adsorbed by the transparent member 490. In this case, color information of the common area can be extracted by finding out characteristic points of the first image and the second image and extracting an overlapping area of the first image and the second image.

Figure 24:
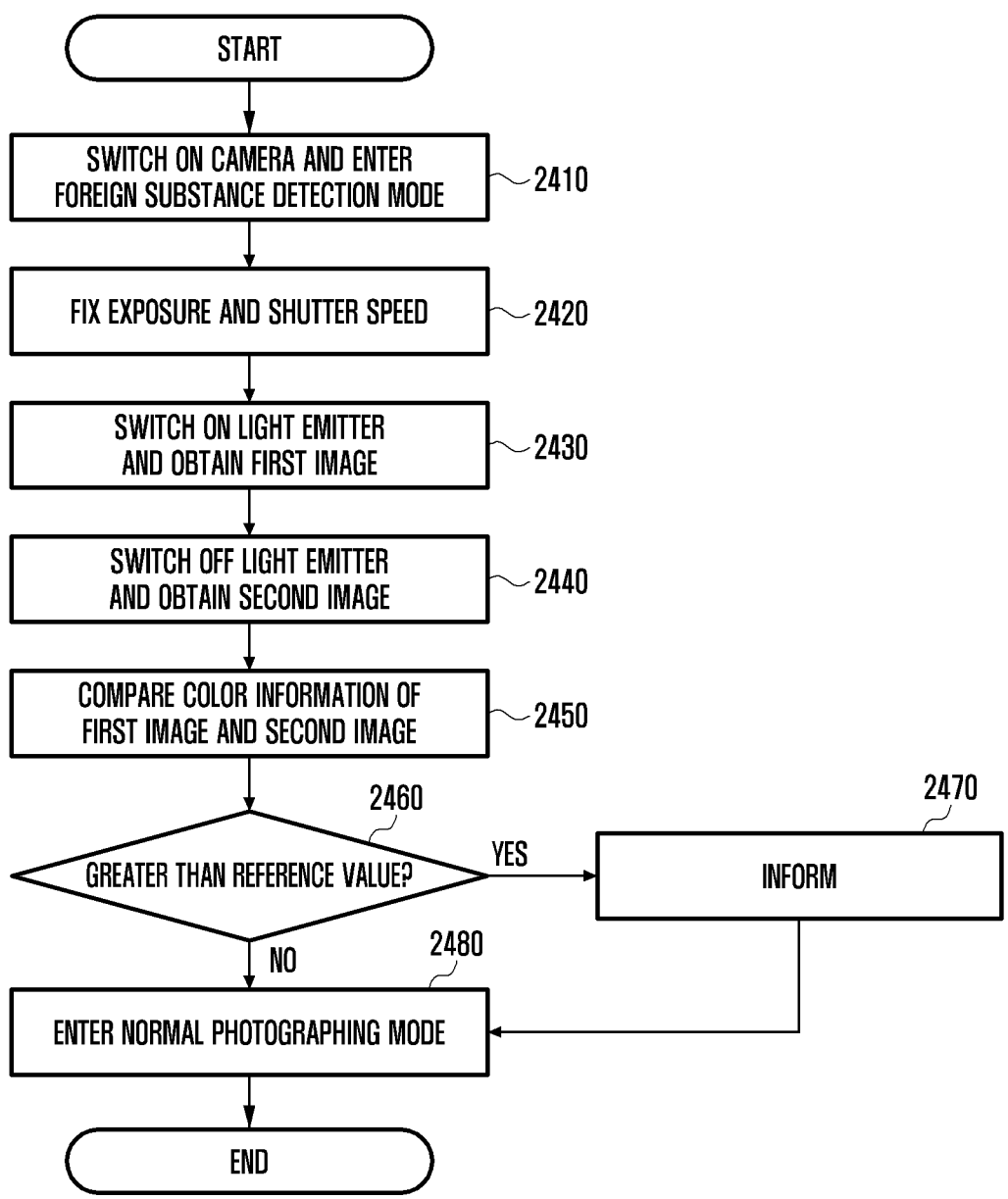
FIG. 24 is a flowchart illustrating a method for providing adsorption information of a foreign substance adsorbed by a transparent member of a camera in an electronic device according to various embodiments of the disclosure.

FIG. 24 is a flowchart illustrating a method for providing adsorption information of a foreign substance adsorbed by a transparent member of a camera in an electronic device according to various embodiments of the disclosure.

Referring to FIG. 24, at operation 2410, the processor 480 puts the camera 430 into a foreign substance detection mode.

At operation 2420, the processor 480 fixes an exposure and a shutter speed of the camera 430. Namely, when entering the foreign substance detection mode, the exposure and the shutter speed are fixed, because the exposure and the shutter speed for images captured by the camera 430 must be same in order to compare color information of the images. In this case, a higher shutter speed is preferable so that continuous photographing can be performed for a subject to obtain each image, and the exposure can be set with a level that color information of each image is not saturated at the corresponding shutter speed.

At operation 2430, the processor 480 obtains a first image of an external object by switching on a light emitter 410 and using the camera 430.

At operation 2440, the processor 480 obtains a second image of the external object by switching off the light emitter 410 and using the camera 430.

At operation 2450, the processor 480 compares color information of the first image and the second image.

At operation 2460, the processor 480 identifies whether a difference of the color information between the first image and the second image is greater than a reference value according to the comparison result at operation 2450.

At operation 2470, if the difference of the color information is greater than the reference value according to the comparison result at operation 2460, the processor 480 determines that a foreign substance is adsorbed at an outer part of the camera 430 and informs a user of the electronic device 400 about foreign substance adsorption information by using at least one of a display 440, audio output unit 450, and vibration output unit 460.

At operation 2480, if the difference of the color information is smaller than the reference value according to the comparison result at operation 2460, the processor 480 puts the camera into a normal photographing mode.

At operation 2460, the reference value for the color information difference of the first image and second image can be preset in a memory 470 by using the following Equations.

Namely, in the case of a 16 bit image, a difference ratio (%) of color information of the first image and the second image based on one pixel of the camera 430 can be obtained by using the following Equation 4.

$$\text{ratio (\%)} = \text{(color information of image captured in state of switching on light emitter−color information of image captured in state of switching off light emitter)}/256 \quad \text{Equation 4}$$

Here, the 256 may indicate a color expression range of red color based on one pixel, i.e., 0~255=256 steps.

Further, in the case of a 16 bit image, a difference ratio (%) of color information between the first image and the second image based on a plurality of pixels of the camera 430 can be obtained through the following Equation 5.

$$\text{ratio (\%)} = \text{(total of color information of pixels in image analysis area captured in state of switching on light emitter−total of color information of pixels in image analysis area captured in a state of switching off light emitter)}/256 * \text{number of pixels in analysis area} \quad \text{Equation 5}$$

Further, in the case of a 24 bit image, a color information difference of the first image and the second image based on one pixel of the camera 430 can be obtained through the following Equation 6.

$$\text{ratio (\%)} = \text{(color information of image captured in state of switching on light emitter−color information of image captured in state of switching off light emitter light emitter)}/2^{*24} \quad \text{Equation 6}$$

Further, in the case of a 24 bit image, a color information difference of the first image and the second image based on a plurality of pixels of the camera 430 can be obtained through the following Equation 7.

$$\text{ratio (\%)} = \text{(total of color information of pixels in image analysis area captured in state of switching on light emitter−total of color information of pixels in image analysis area captured in a state of switching off light emitter)}/(2^{*24}) * \text{number of pixels in analysis area} \quad \text{Equation 7}$$

Namely, if the ratio extracted by Equations 4 to 7 is greater than a specific reference value (0.01~30%), the processor 480 can determine that a foreign substance is adsorbed by the transparent member 490 of the camera 430.

Figure 25:
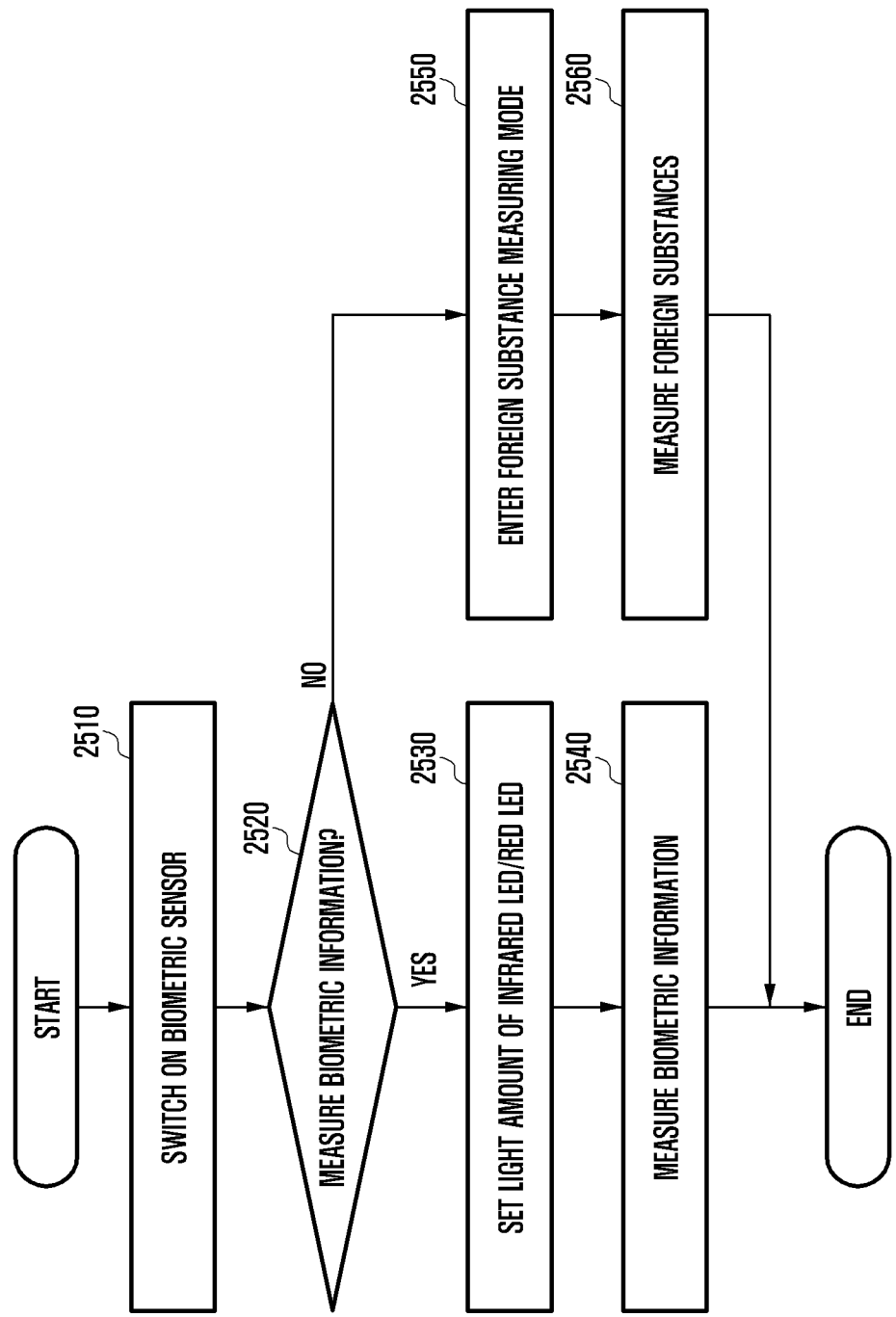
FIG. 25 is a flowchart illustrating a method for measuring a foreign substance adsorbed by a transparent member of a camera in an electronic device according to various embodiments of the disclosure.

FIG. 25 is a flowchart illustrating a method for measuring a foreign substance adsorbed by a transparent member of a camera in an electronic device according to various embodiments of the disclosure.

Referring to FIG. 25, at operation 2510, if a foreign substance detecting application is executing, the processor 480 switches on a biometric sensor 420.

At operation 2520, the processor 480 identifies a biometric information measuring mode or a foreign substance measuring mode through the biometric sensor 420.

At operation 2530, if the identification result at operation 2520 is the biometric information measuring mode, the processor 480 sets a light amount of a light emitter 410 (e.g., IR LED and red LED) installed in the biometric sensor 420. For example, an electric current of the light emitter 410 can differ according to a skin state of a user of the electronic device 400.

At operation 2540, the processor 480 measures biometric information (e.g., heart rate and blood pressure) of the user of the electronic device 400 by using the light amount set at operation 2530.

In the meantime, if the identification result at operation 2520 is the foreign substance measuring mode, the processor 480 puts the biometric sensor 420 into the foreign substance measuring mode at operation 2550 and measures a foreign substance adsorbed by the transparent member 490 of the camera 430 at operation 2560.

When measuring the foreign substance at operation 2560, the processor 480 can select a light emitter 410 having a wavelength to be used for measuring the foreign substance and fix an electric current amount to a predetermined value. Further, the processor 480 can obtain a first image and a second image in a state of switching off the light emitter 410 according to synchronization of a shutter timing of the camera 430. Because the processor 480 can selectively switch the light emitter 410, electric current consumption of the electronic device 400 can be reduced. The processor 480 can increase the accuracy of detecting a foreign substance adsorbed on the transparent member 490 by switching on a plurality of light emitters 410 and measuring the foreign substance with each corresponding wavelength.

According to various embodiments of the disclosure, a photo and a video having an excellent quality without a distortion can be obtained by using a biometric sensor and a camera equipped in an electronic device, detecting a foreign substance adsorbed by a transparent member of a camera, and removing the foreign substance by informing a user of the electronic device about adsorption information of the detected foreign substance.

While the disclosure has been shown and described with reference to various embodiments thereof, it will be understood by those skilled in the art that various changes in forms and details may be made therein without departing from the spirit and scope of the disclosure as defined by the appended claims and their equivalents.

What is claimed is:

1. An electronic device comprising:
    a transparent member formed with a first medium and a second medium, the second medium formed at an outer part of the transparent member;
    a light emitter disposed under the transparent member and configured to emit light;
    a camera disposed under the transparent member and configured to obtain an image of an external object; and
    a processor configured to:
        obtain a first image of the external object by using a difference of light refracting angles between the first medium and the second medium by using the camera while at least one part of the light emitted by the light emitter is transmitted through an inner part of the second medium,
        obtain a second image of the external object by using the camera, and
        provide foreign substance information of a third medium adsorbed on at least one part of an outer surface of the transparent member by using a color difference between at least one partial area of the first image and at least one partial area of the second image.

2. The electronic device of claim 1, wherein the transparent member comprises at least one of a lens, a window glass, or a cover glass.

3. The electronic device of claim 1, further comprising another transparent member formed with a fourth medium to change a light refracting angle between the transparent member and the light emitter.

4. The electronic device of claim 1, wherein the light emitter and the camera are displaced with a predetermined distance.

5. The electronic device of claim 1, further comprising a light receiver, wherein the light emitter and the light receiver are equipped in one biometric sensor.

6. The electronic device of claim 1, wherein the processor is further configured to identify a scratch formed at a specific location of the transparent member, if an abnormal image quality is detected continuously in a specific area of the external object.

7. The electronic device of claim 1, wherein the processor is further configured to provide adsorption information of the foreign substance by using at least one of a user interface (UI) through a display, a guide voice through an audio output device, or a vibration through a vibration output device.

8. The electronic device of claim 1, further comprising a memory, wherein the processor is further configured to store an image by attaching a tag informing about the foreign substance, if the image is captured in a state of a foreign substance adsorbed by the transparent member.

9. The electronic device of claim 1, wherein the processor is further configured to compensate a light amount by controlling an electric current of the light emitter, if an amount of the light emitted by the light emitter is different from a predetermined reference value.

10. The electronic device of claim 3, wherein the other transparent member comprises at least one of a buffer window, a diffuser, or a diffractive optical element (DOE) equipped between the transparent member and the light emitter.

11. A method for providing adsorption information of a foreign substance in an electronic device, the method comprising:
    emitting, by a light emitter, light towards a camera disposed under a transparent member formed with a first medium and a second medium, the second medium formed at an outer part of the transparent member;
    obtaining, by a processor, a first image of an external object by using a difference of light refracting angles between the first medium and the second medium by using the camera while at least one part of the light emitted by the light emitter is transmitted through an inner part of the second medium;
    obtaining, by the processor, a second image of the external object by using the camera; and
    providing, by the processor, foreign substance information of a third medium adsorbed on at least one part of an outer surface of the transparent member by using a color difference between at least one partial area of the first image and at least one partial area of the second image.

12. The method of claim 11, further comprising:
    changing, by the processor, a light refracting angle by using another transparent member formed with a fourth medium between the transparent member and the light emitter.

13. The method of claim 11, further comprising:
    identifying, by the processor, a scratch formed at a specific location of the transparent member, if an abnormal image quality is detected continuously in a specific area of the external object.

14. The method of claim 11, further comprising:
    providing, by the processor, adsorption information of the foreign substance by using at least one of a user interface (UI) through a display, a guide voice through an audio output device, or a vibration through a vibration output device.

15. The method of claim 11, further comprising:
    storing, by the processor, an image by attaching a tag informing about the foreign substance, if the image is captured in a state of a foreign substance adsorbed by the transparent member.

16. The method of claim 11, further comprising: compensating, by the processor, a light amount by controlling an electric current of the light emitter, if an amount of the light emitted by the light emitter is different from a predetermined reference value.

17. The method of claim 11, further comprising:
    searching, by the processor, characteristic points of the first image and the second image;
    extracting a common area overlapping the first image and the second image; and
    extracting color difference information for the common area.

18. The method of claim 11, further comprising:
fixing, by the processor, an exposure and a shutter speed of the camera, when entering a foreign substance detecting mode of the electronic device.

19. The method of claim 11, further comprising:
obtaining, by the processor, a first image by switching on the light emitter and using the camera and obtaining a second image by switching off the light emitter and using the camera.

20. At least one non-transitory computer readable recording medium recorded with a program executing a method for providing foreign substance adsorption information in an electronic device, the electronic device comprising
a transparent member formed with a first medium and a second medium, the second medium formed at an outer part of the transparent member;
a light emitter disposed under the transparent member for emitting light;
a camera disposed under the transparent member for obtaining an image of an external object; and
a processor; and
the method comprising:
obtaining a first image of the external object by using a difference of light refracting angles between the first medium and the second medium by using the camera while at least one part of the light emitted by the light emitter is transmitted through an inner part of the second medium;
obtaining a second image of the external object by using the camera; and
providing foreign substance information of a third medium adsorbed on at least one part of an outer surface of the transparent member by using a color difference between at least one partial area of the first image and at least one partial area of the second image.

* * * * *